United States Patent [19]

Konomura

[11] Patent Number: 5,469,254
[45] Date of Patent: Nov. 21, 1995

[54] METHOD AND APPARATUS FOR MEASURING THREE-DIMENSIONAL POSITION OF A PIPE FROM IMAGE OF THE PIPE IN AN ENDOSCOPIC OBSERVATION SYSTEM

[75] Inventor: Yutaka Konomura, Tachikawa, Japan

[73] Assignee: Olympus Optical Co., Ltd., Tokyo, Japan

[21] Appl. No.: 43,207

[22] Filed: Apr. 5, 1993

[30] Foreign Application Priority Data

| Apr. 6, 1992 | [JP] | Japan | 4-084066 |
| Jul. 9, 1992 | [JP] | Japan | 4-182595 |
| Aug. 14, 1992 | [JP] | Japan | 4-217049 |

[51] Int. Cl.⁶ .................................. G02B 23/26
[52] U.S. Cl. .................. 356/241; 348/65; 600/101
[58] Field of Search .................. 356/241, 237, 356/375, 376, 384, 378, 387, 390, 394; 364/560, 564; 128/4, 6; 382/8; 250/562, 563, 560, 561; 348/65–74, 137, 138, 141, 45

[56] References Cited

U.S. PATENT DOCUMENTS

| 4,340,302 | 7/1982 | Oku . | |
| 4,588,294 | 5/1986 | Siegmund | 356/241 |
| 4,702,229 | 10/1987 | Zobel . | |
| 4,916,533 | 4/1990 | Gillies et al. | 348/65 |
| 4,980,763 | 12/1990 | Lia . | |
| 5,018,509 | 5/1991 | Suzuki et al. | 348/65 |
| 5,036,464 | 7/1991 | Gillies et al. | 348/65 |
| 5,048,956 | 9/1991 | Sakamoto et al. | 356/241 |
| 5,070,401 | 12/1991 | Salvati et al. . | |

Primary Examiner—Hoa Q. Pham
Attorney, Agent, or Firm—Armstrong, Westerman, Hattori, McLeland & Naughton

[57] ABSTRACT

An image of a pipe having a uniform cross section, e.g., a circular cross section, is imaged with an endoscope and is displayed on a monitor screen. A measuring coordinate system for determining a three-dimensional position on a surface of the pipe from a position in the image is calculated by using information which relates to a position in the image and a corresponding actual position on the pipe surface, and which consists of extracted image information on the displayed image, e.g., information on the position of a cross-sectional figure and the position of a vanishing point, and known information on the size of the pipe and an imaging optical system.

45 Claims, 34 Drawing Sheets

FIG.17

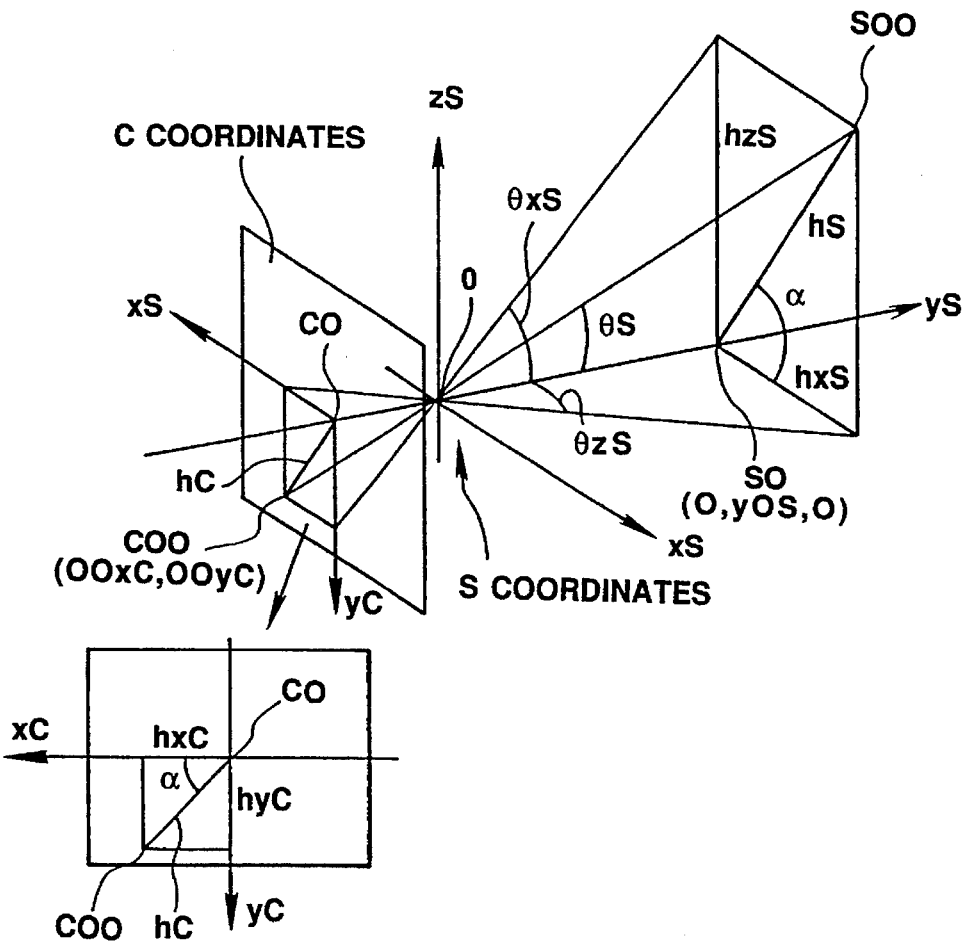

$$\begin{cases} \cos \alpha = hxC/hC \\ \sin \alpha = hyC/hC \end{cases} \quad \text{---} \quad (1')$$

$$\tan \theta S = hS/yOS \quad \text{---} \quad (2')$$

$$\begin{cases} \tan \theta zS = hzS/yOS \\ \tan \theta zS = hxS/yOS \end{cases} \quad \text{---} \quad (3')$$

$$\begin{cases} hxS = hS \cos \alpha \\ hzS = hS \cos \alpha \end{cases} \quad \text{---} \quad (4')$$

(1') IS SUBSTITUTED IN (4') AND (2') AND (4') ARE SUBSTITUTED IN (3')

$$\begin{cases} \tan\theta S = \dfrac{D/2}{yOS} \\ hC = f \cdot \sin\dfrac{\theta S}{dist} \end{cases}$$

START

↓

S15-4a: CALCULATE ANGLE θ1 FROM AXIS xM EXIBITED WHEN FIRST POINT(x1,y1,z1) IS PROJECTED ON yM=0 BY $$\cos\theta_1 = x_1 / \sqrt{x_1^2 + z_1^2}$$

↓

S15-4b: ALSO WITH RESPECT TO SECOND POINT (x2,y2,z2), $$\cos\theta_2 = x_2 / \sqrt{x_2^2 + y_2^2}$$

↓

S15-4c: CALCULATE LENGTH hi OF CIRCULAR ARC PROJECTED ON yM=0 BY $$h_i = D \times \frac{\theta_2 - \theta_1}{2\pi}$$

↓

S15-4d: CALCULATE LENGTH L ALONG PIPE INNER SURFACE $$L = \sqrt{h_i^2 + (y_2 - y_1)^2}$$

↓

RETURN

METHOD AND APPARATUS FOR MEASURING THREE-DIMENSIONAL POSITION OF A PIPE FROM IMAGE OF THE PIPE IN AN ENDOSCOPIC OBSERVATION SYSTEM

BACKGROUND OF THE INVENTION

This invention relates to a method and an apparatus for measuring a three-dimensional position of a surface of a lengthwise object such as a pipe having a uniform cross section from a corresponding two-dimensional observed image of the object surface to measure, for example, the size of a defect in the surface.

Conventionally, methods described below have been used to measure the length of a defect existing in an inner surface of a pipe.

In one conventional method, a reference object the length of which is known is placed in a pipe, and the reference object and a defect are compared with each other in an image to measure the length of the defect.

In other conventional methods, a chart is projected at a distance (base length) from an observation optical system, and three-dimensional coordinates are calculated on the basis on a misalignment of the chart in an observed image, or a patten is projected as disclosed in Japanese Utility Model Laid-Open No.57-29806 to calculate three-dimensional coordinates. In a method disclosed in Japanese Patent Laid-Open No.63-140903, a light sectioning line is projected to measure a position on a cylindrical object.

Thus, measurement of a defect in a pipe or a similar structure has been performed by using a reference object with respect to the measured object, projecting a chart or using an auxiliary means. That is, three-dimensional coordinates are not calculated from an observed image alone.

There are therefore problems relating to the need for a means for projecting a chart or an auxiliary means, and a problem of apparatuses capable of such measurement being limited. There is a need for a system enabling existing apparatuses having no such means to measure length and other quantities. It is very convenient if there is a system capable of measuring a target by obtaining variables, other than known constants, required at the time of measurement from an observed image, in other words, capable of measurement using no auxiliary measuring instrument.

SUMMARY OF THE INVENTION

An object of the present invention is to provide a three-dimensional position measuring method and a three-dimensional position measuring apparatus capable of measuring the length of a defect by obtaining information other than known constants, e.g., the diameter of a pipe, without requiring an auxiliary measuring instrument.

Another object of the present invention is to provide a three-dimensional position measuring method and a three-dimensional position measuring apparatus exhibiting improved flexibility.

According to one aspect of the present invention, there is provided a three-dimensional position measuring method comprising the steps of observing an elongated member having a uniform cross section, calculating information necessary for calculating a three-dimensional position on a surface of the elongated member from information in an observed image, and setting a coordinate system capable of determining a three-dimensional position corresponding to an arbitrary position in the observed image of the elongated member by using known information on the elongated member and an observation optical system. It is thereby possible to measure a three-dimensional position, length and the like without using any auxiliary measuring instrument.

According to another aspect of the present invention, there is provided a three-dimensional position measuring apparatus capable of observing an elongated member having a uniform cross section and measuring a three-dimensional surface of the elongated member from information in an observed image, comprising calculation means for calculating information necessary for calculating a three-dimensional position on a surface of the elongated member by extracting information on a vanishing point in the image of the elongated member and other information, and coordinate setting means for setting a coordinate system capable of determining a three-dimensional position corresponding to an arbitrary position in the observed image of the elongated member by using known information on the elongated member and an observation optical system.

These and other objects, features and advantages of the present invention will become apparent from the following detailed description of preferred embodiments of the invention.

BRIEF DESCRIPTION OF THE DRAWINGS

FIGS. 1 to 41 relates to a first embodiment of the present invention;

FIG. 1 is an illustration of the overall construction of an endoscopic apparatus in accordance with the first embodiment;

FIG. 2 is a cross-sectional view of the construction at an fore end of the electronic endoscope;

FIG. 3 is a diagram of a state in which a fore end portion of the electronic endoscope is inclined;

FIG. 4 is a diagram of an observed image obtained in the state shown in FIG. 3;

FIG. 5 is a diagram of a state of observation inside a pipe;

FIG. 6 is a graph of the change in brightness level of reflected light in a longitudinal direction of the pipe;

FIG. 7 is a diagram of an observed image in a case where a center of an objective coordinate system coincides with a center of the pipe;

FIG. 8 is a diagram of a state in which the fore end portion of the electronic endoscope is inclined while the coordinate center of the objective optical system is set to the center axis of the pipe;

FIG. 9 is a diagram of an observed image obtained in the state shown in FIG. 8;

FIG. 10 is a diagram of a state in which the fore end portion of the endoscope is shifted in parallel with the center axis of the pipe;

FIG. 11 is a diagram of an observed image obtained in the state shown in FIG. 10;

FIG. 12 is a block diagram of the construction of a measuring unit;

FIG. 14 is a diagram of the relationship between the fore end portion of the scope and the coordinate systems;

FIG. 15 is a diagram of an observed image obtained in the case shown in FIG. 14;

FIG. 16 is a flowchart of a process for making a measuring coordinate system coincide with a pipe coordinate system;

FIG. 17 is a diagram of the relationship between an S coordinate system and a C coordinate system;

FIG. 18 is a diagram of the relationship between the S coordinate system and the C coordinate system when the center axis of the optical system and the pipe center axis coincide with each other;

FIG. 19 is a diagram of the relationship between the S coordinate system and the C coordinate system when the center axis of the optical system is moved from the state shown in FIG. 18 in parallel with the center axis of the pipe;

FIG. 21 is a flowchart of a program of the method of the present invention;

FIG. 22 is a flowchart of an image reading process;

FIG. 23 is a flowchart of an automatic coordinate alignment process;

FIG. 24 is a flowchart of a process of extracting a darkest point in the image frame;

FIG. 25 is a flowchart of a process of calculating an inclination of the scope relative to the pipe from shifts of an image center and a darkest point on the image plane;

FIG. 26 is a flowchart of a process of inclining the measuring coordinate system by a value obtained by multiplying the calculated inclination by −1;

FIG. 28 is a flowchart of a process of extracting an equi-brightness line and determining a center and a diameter of the circle of the equi-brightness line;

FIG. 29 is a diagram of a method of obtaining a center of an equi-brightness circle from a set of brightness points;

FIG. 30 is a flowchart of a process of obtaining the distance of an equi-brightness line from the coordinate center of the optical system from the diameter of the equi-brightness circle;

FIG. 31 is a diagram of calculation for obtaining an incident angle defining an image height;

FIG. 33 is a diagram of a method of determining a brightness difference by setting a plurality of point s on the circumference of a circle on the center of the image frame;

FIG. 34 is a flowchart of a process of shifting a darkest point if the brightness over an image is uneven;

FIG. 35 is a flowchart of a process of calculating three-dimensional coordinates of a center of an equi-brightness circle at a distance from shifts of a darkest point and the center of the equi-brightness circle a darkest point the same distance of the circle;

FIG. 37 is a flowchart of a process of translating the measuring coordinate system by values obtained by multiplying x- and z-coordinates of the center by −1;

FIG. 38 is a flowchart of a measuring process;

FIG. 39 is a flowchart of a process of calculating three-dimensional coordinates in the measuring coordinate system of a point designated in the image frame;

FIG. 40 is a flowchart of a process of calculating the length of a circular arc defined by two designated points;

FIG. 41 is a diagram of two measured points on a pipe;

FIGS. 42a to 42d are diagrams of a state of setting the positions of a vanishing point and guide lines for equi-brightness lines in accordance with the second embodiment;

FIGS. 43a and 43b are diagrams of other examples of guide lines shown in FIGS. 42;

FIG. 44 is a diagram of the overall construction of the third embodiment;

FIG. 45 is a diagram of an observed image in the third embodiment;

FIG. 46 is a diagram of observation inside a U-shaped pipe;

FIG. 47 is a diagram of an observed image obtained in the case shown in FIG. 46;

FIG. 48 is a diagram of the relationship between the relationship between two equi-brightness circles and the endoscope fore end portion;

FIG. 49 is a flowchart of a process of calculating three-dimensional coordinates in the measuring coordinate system of a point designated in the image frame;

FIG. 50 is a diagram of the disposition of a coordinate system in a case where irregularities in a pipe is measured;

FIG. 51 is a diagram of positions in an observed image in the case shown in FIG. 50;

FIG. 52 is a diagram of the height of irregularities in the pipe;

FIG. 53 is a diagram of the distance been two lines obtained when irregularities in the pipe are measured; and FIG. 54 is a flowchart of a calculation process for measuring irregularities in the pipe.

DESCRIPTION OF THE PREFERRED EMBODIMENTS

Figure 1:
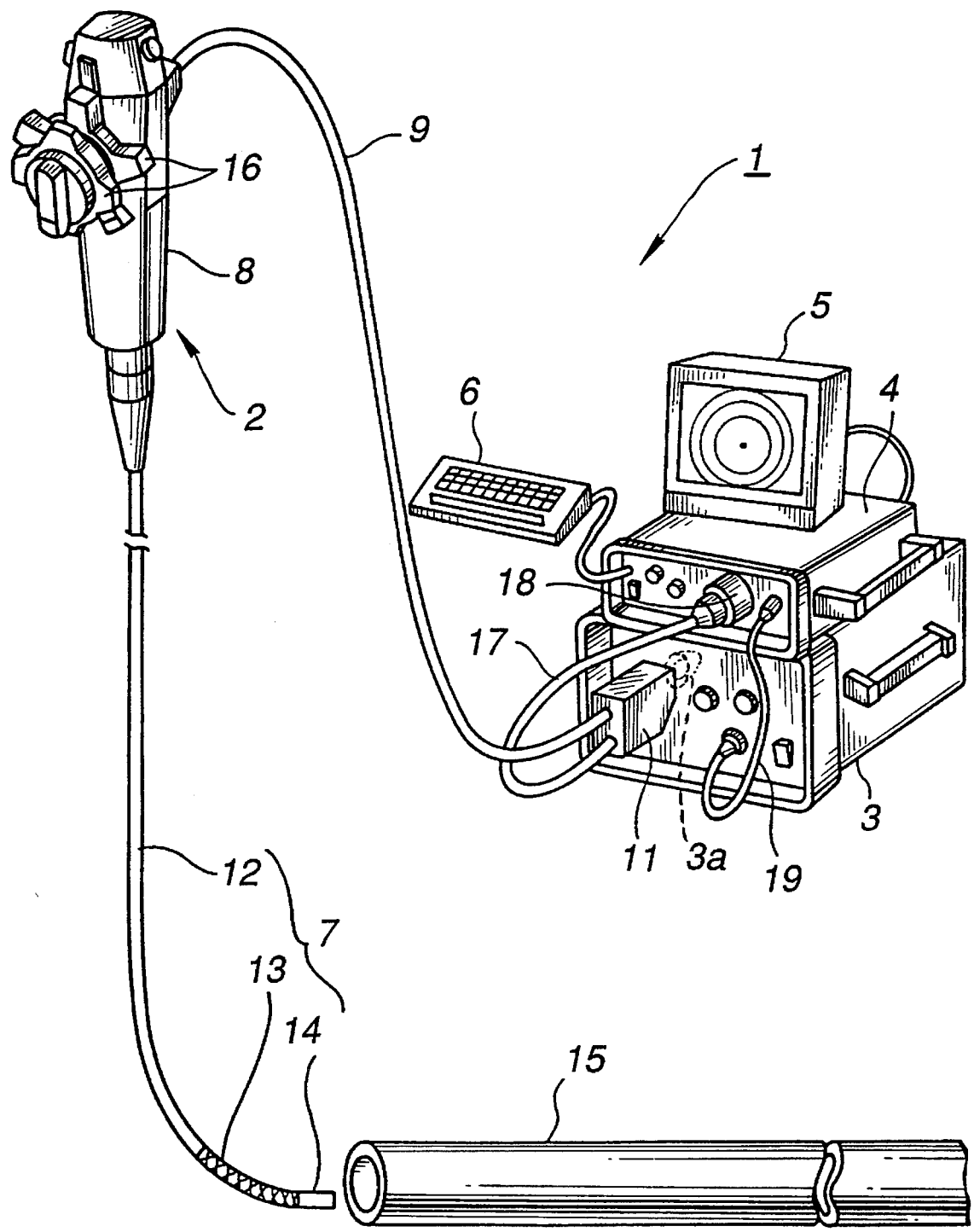

FIG. 1 shows a three-dimensional measuring apparatus in accordance with the present invention, which is an endoscopic apparatus arranged to observe the interemis of pipes. The endoscopic apparatus shown in FIG. 1 has an electronic endoscope (electronic scope) 2 incorporating an image pickup means, a light source unit 3 for supplying illumination light to the electronic scope 2, a measuring unit 4 for processing a signal from the image pickup means of the electronic scope 2, and a monitor 5 for displaying an image of an image signal outputted from the measuring unit 4. A keyboard 6 for inputting data is connected to the measuring unit 4.

The electronic scope 2 has an elongated inserted portion 7, a thicker operated portion 8 formed at a rear end of the inserted portion 7, and a universal cord 9 extending from the operated portion 8. A connector 11 provided at an extreme end of the universal cord can be detachably connected to the light source unit 3.

The inserted portion 7 has an elongated soft portion 12 extending from the operator side, a bendable portion 13 which can be freely bent, and a fore end portion 14 in which objective optical system and an illumination optical system described later are provided. The inserted portion 7 is inserted, from its fore end portion 14, into an examined object, e.g., a pipe 15, to examine an internal surface of the pipe 15. An angle knob 16 for bending the bendable portion 13 is provided on the operated portion 8.

One end of an electric cord 17 is connected to the connector 11, and the other end of the electric cord 17 is connected to an electric connector 18. The electric connector 18 can be connected to the measuring unit 4. The measuring unit 4 and the light source unit 3 are connected through a light control cable 19 for transmitting a signal for controlling the quantity of illumination light. For example, the intensity of illumination light supplied from a lamp 3a in the light source unit 3 to an incident end surface of a light guide 21 (FIG. 2) is controlled with a stop (not shown) according to a brightness level of an image signal to display an image at a brightness suitable for observation.

Figure 2:
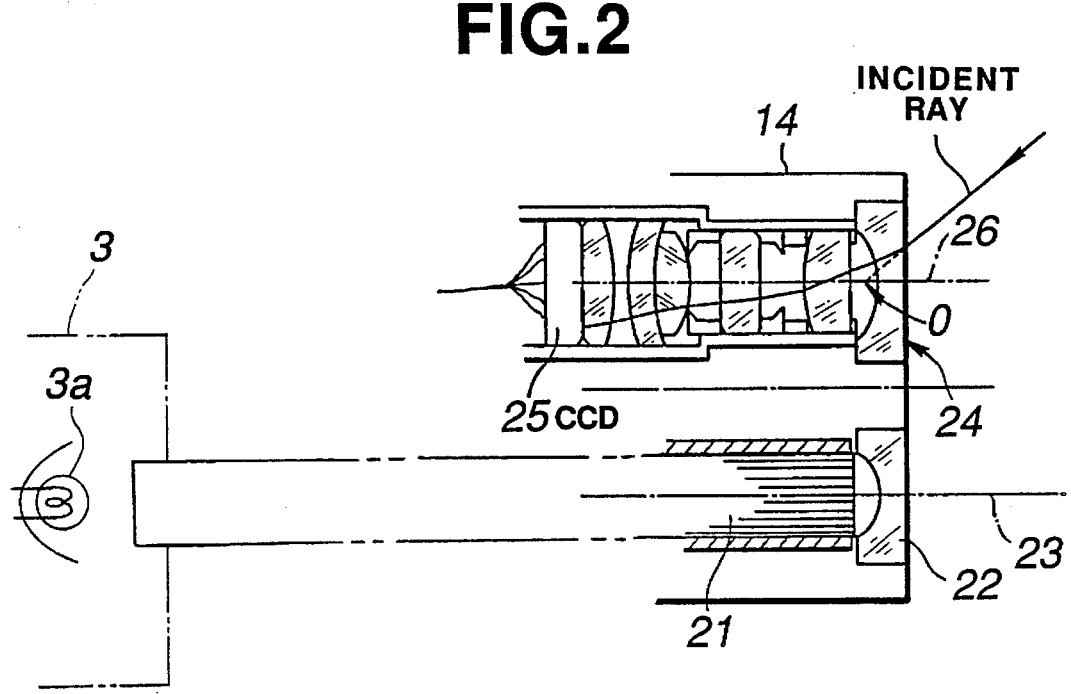

FIG. 2 shows the optical system at the fore end of the electronic endoscope 2. The light guide 21 is inserted through the inserted portion 7 and the universal cord 9 extending from the operated portion 8. An end portion of the light guide 21 (on the fore end side of the inserted portion 7) is fixed to an illumination window provided in the fore end portion 14. Illumination light supplied to the incident end surface is transmitted to the end surface at this end, i.e., an emergence end surface to be emitted through the same.

An illumination lens 22 constituting an illumination optical system is mounted so as to face this emergence end surface. Illumination light emitted form the emergence end surface is expanded by the illumination lens 22 and illuminates an object through which a center axis 3 of the illumination optical system extends on the front side.

An observation window is provided adjacent to the illumination window, and the objective optical system (observation optical system) 24 is attached to the observation window through a lens frame. The objective optical system forms an image of the illuminated object at an imaging position. A CCD 25 is disposed at the imaging position of the objective optical system 24. The CCD 25 converts the light of the image formed by the objective optical system 24 into an electrical signal.

The electrical signal converted from the image light by the CCD 25 is supplied to a video input circuit 61 (FIG. 12) in the measuring unit 4 through the inserted portion 7, the operated portion 8, the universal cord 9, the connector 11, the electric cord 17 and the electric connector 18. The supplied image signal is converted into a standard video signal by being processed by the video input circuit 61, a frame memory 62 and a video output circuit 63. The standard video signal is sent to the monitor 5 and an image of the object is displayed on a display screen of the monitor 5.

For example, the objective optical system 24 is formed of six lenses inclusive of a concave lens placed at the fore end. The CCD 25 is jointed to this lens array at the rear of a rear end convex lens. FIG. 2 shows a route of an incident ray reaching the CCD 25 surface about a center axis 26 of the objective optical system 24.

A point at which an incident ray intersects the center axis 26 of the objective optical system 24 when there is no lens is referred to as a coordinate center O of the (objective) optical system.

Figure 3:
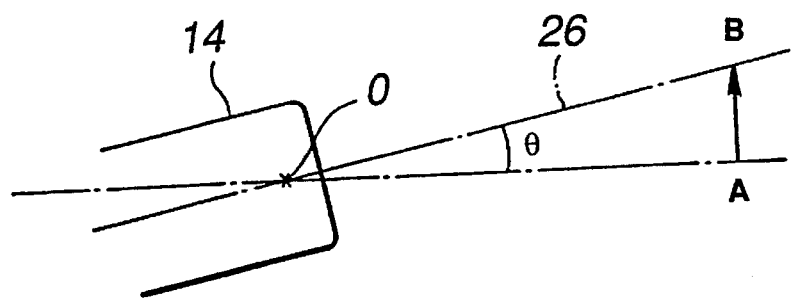

As shown in FIG. 3, the objective optical system 24 is inclined by an angle θ on the coordinate center O of the optical system to set the center axis 26 of the objective optical system 24 to an object point B of an object AB. For the of convenience' sake, the center axis 26 of the objective optical system 24 is represented by a line corresponding to the center axis of the fore end portion 14 in FIG. 3 (and other figures).

Figure 4:
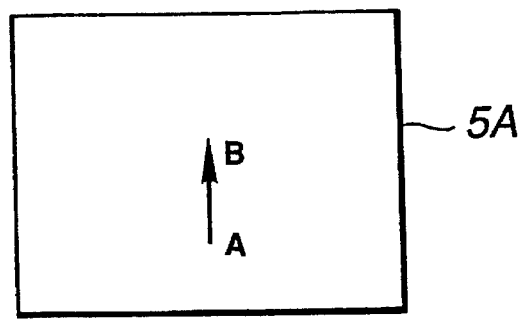

An observed image displayed on the display screen 5A of the monitor 5 under this condition is as shown in FIG. 4. That is, the object point B is located at the center of the observed image an object point A is located below the point B. The emergent angle of a ray from the center axis of the optical system corresponding to the position A can be calculated from the image, as described later. In this case, since the electronic scope 2 is rotated on the coordinate center O of the optical system, the calculated emergence angle coincides with the angle of rotation of the electronic scope 2.

If the center of rotation is located on the operator side relative to the coordinate center O of the optical system, an image portion is shifted to a substantially large extent when the electronic scope 2 is rotated only through a small angle. Conversely, if the center of rotation is located on the object side relative to the coordinate center O, the shift of an image portion is small when the electronic scope 2 is rotated through a substantially large angle.

For ease of observation, the optical image imaged on the CCD 25, which is inverted in the vertical direction so that the object point A is placed in an upper position at a center of the CCD 25 while the object point B is placed below the object point A, is displayed on the display screen 5A of the monitor by being further inverted as shown in FIG. 4. The position of the center of the CCD 25 coincides with the center of the display screen of the monitor 5.

Figure 5:
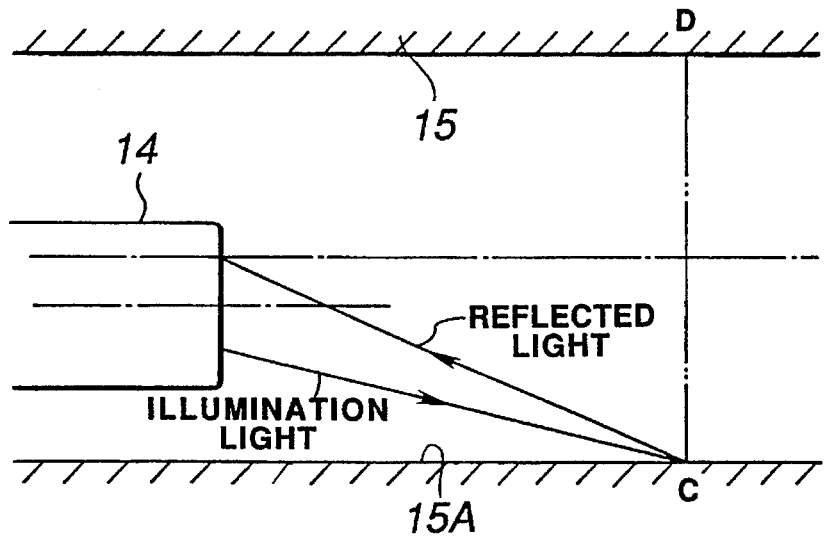

FIG. 5 shows rays of light when an internal portion of the pipe 15 is observed.

Illumination light traveling out of the illumination lens 22 illuminates a certain point C on an internal surface 15A of the pipe 15, and light reflected from this point returns to the objective optical system. The brightness of this reflected light is displayed as the brightness of the point C in the observed image.

Figure 6:
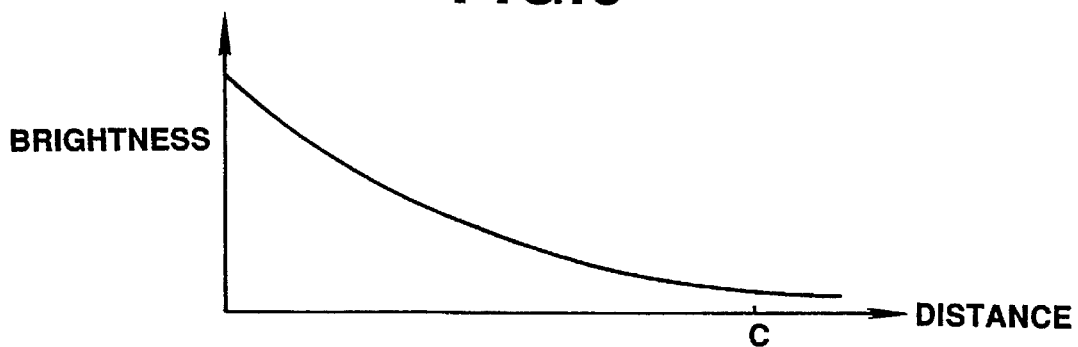

FIG. 6 is a graph in which the change in brightness level of the reflected light in the lengthwise direction of the pipe 15 is quantitatively shown. As shown in this graph, the change in brightness level is represented by a monotonic increase function.

If the point C is at a certain position remote from the fore end of the scope 2, unevenness (variation) of the brightness due to the difference between the positions of the illumination optical system and the objective optical system is negligible, and the quantities of light reflected from different points on the circumference corresponding to the cross section CD of the pipe 15 can be regarded as equal.

Figure 7:
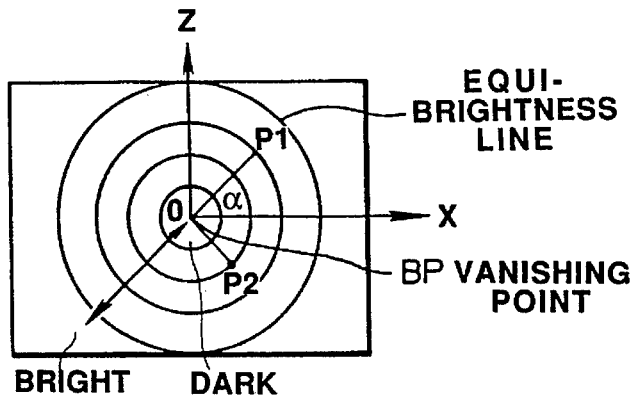

That is, if the center of the objective optical system coincides with the center of the pipe 15, an equi-brightness line along which the brightness is constant is formed in the observed image as a circle having a center corresponding to the image center, as shown in FIG. 7. The center of the image coincides with the center axis of the pipe 15 and with a vanishing point BP corresponding to a darkest portion of the pipe image (which is not reached by the illumination light).

As indicated by the arrows in FIG. 7, the image is darkest at the center and is brighter at a position remote from the center of the image.

Figure 8:
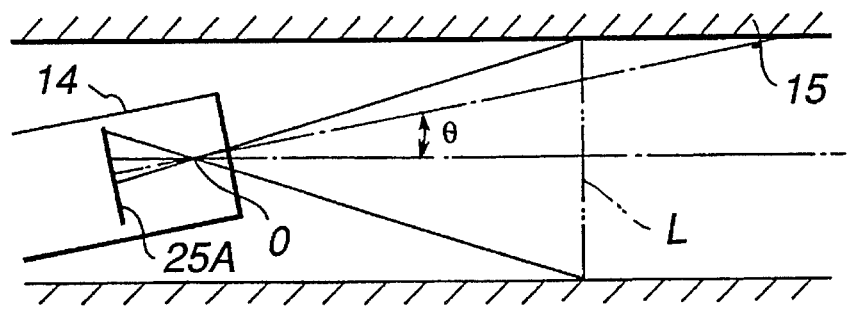

FIG. 8 illustrates the formation of an image in a case where the coordinate center O of the objective optical system is located on the center axis of the pipe 15 and where the center axis of the optical system is at an angle θ from the center axis of the pipe 15. A reference symbol 25A in FIG. 8 represents the image pickup surface (photoelectric conversion surface) of the CCD 25.

Figure 9:
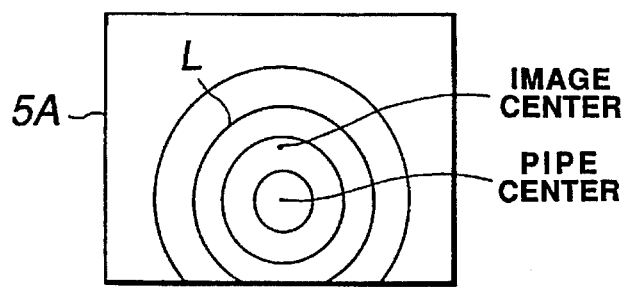

FIG. 9 shows an observed image (image on the display screen 5A of the monitor 5) in the case of the image formation shown in FIG. 8. The center of the pipe 15 (vanishing point) is shifted toward the bottom side of the image. This shift corresponds to the angle θ, as described later.

The equi-brightness line shown in FIG. 8 (a double-dot dash line L) forms a circle, as shown in FIG. 9, and it can be understood from the geometrical relationship shown in FIG. 8 that the center of the circle coincides with the center of the pipe 15. If the angle θ is large, the equi-brightness line forms an ellipse. In FIG. 9 are also shown equi-brightness lines other than the equi-brightness line (indicated by L) corresponding to the double-dot dash line L in FIG. 8.

That is, even if the center axis of the optical system has a certain inclination, there is no change in the viewed form of equi-brightness lines, i.e., the concentric form on the center of the pipe 15 is not changed.

Figure 10:
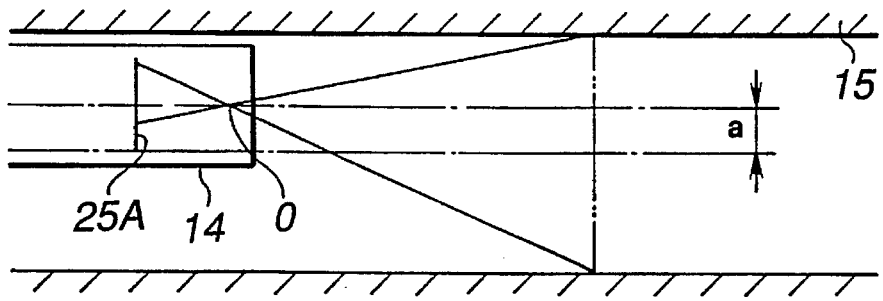

FIG. 10 illustrates image formation in a case where the center axis of the objective optical system is at a distance a from the center axis of the pipe 15 while these axes are parallel to each other.

Figure 11:
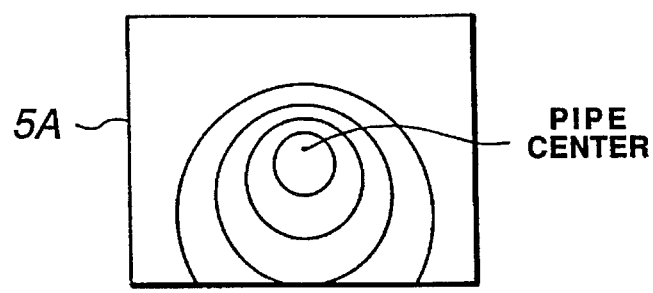

FIG. 11 shows an observed image in the case of the image formation shown in FIG. 10. Since the center axes of the objective optical system and the pipe 15 are parallel to each other, the center of the pipe 15, i.e., the position of the vanishing point in the observed image is not changed, that is, the vanishing point is located at the center of the image.

The equi-brightness line shown in FIG. 10 is also exhibited as a circle, as shown in FIG. 11, but has a center shifted toward the bottom side of the image and to the extent corresponding to the shift a.

That is, if the center O of the optical system is shifted from the center axis of the pipe 15 while being maintained parallel to the same, the center of a circle formed by an equi-brightness line is moved to the extent in accordance with the shift a, although the vanishing point of the pipe 15 is not shifted in the image. As described above, the relationship between the center of the image and the vanishing point and the relationship between the vanishing point and the center of equi-brightness circles are determined independently of each other, and values representing them can be calculated.

Figure 12:
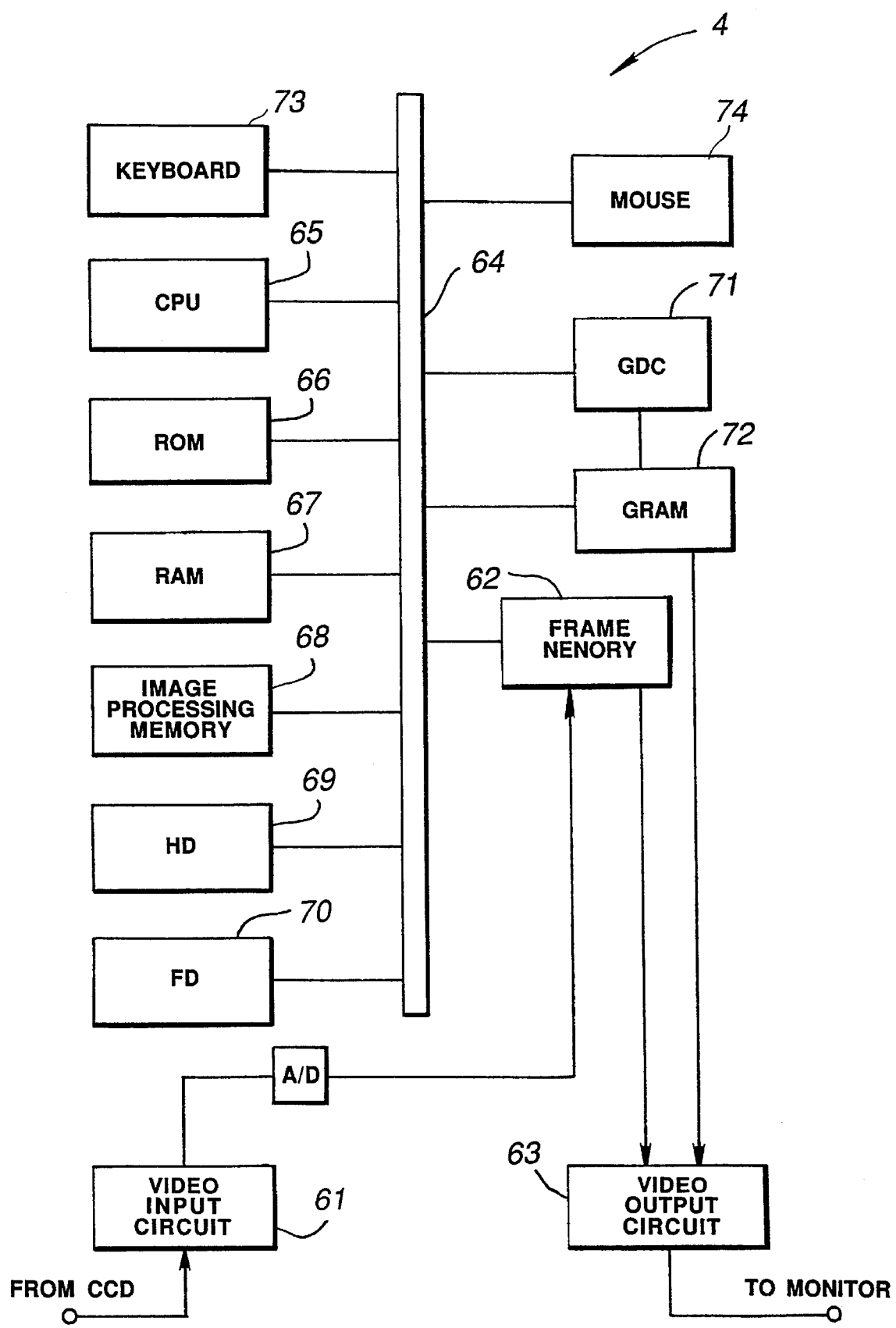

FIG. 12 shows the construction of the measuring unit 4. An output signal from the CCD 25 supplied through the electrical connector 18 is inputted to the video input circuit 61. The video input circuit 61 amplifies the signal and then forms a brightness signal Y and a color signal C therefrom. The brightness signal Y and the color signal C, which are analog signals, are converted into digital signals by an A/D converter and are stored in the frame memory 62. The video signals stored in the frame memory 62 are read out, converted into analog signals and outputted to the monitor 5 together with a sync signal. A picked-up object image is thereby displayed on the display screen of the monitor 5.

The frame memory 62 is connected to a CPU 65 through a bus 64 formed of an address bus, a data bus and a control bus. The CPU 65 performs measurement processing and the like by using the video data stored in the frame memory 62.

The CPU 65 is also connected, through the bus 64, to a ROM 66 in which a three-dimensional measurement program is written, a RAM 67 used to execute the program and for other operations, an image processing memory 68 used as a work area for image processing, a hard disk 69 on which picked-up images, data necessary for image processing and the like are recorded, a floppy disk unit 70, a graphic display controller (GDC) 71 for controlling a graphic display, and a graphic RAM 72 connected to the GDC 71 used to effect a graphic display.

The graphic RAM 72 is connected to the video output circuit 63 to supply an image formed for measurement to the video output circuit 63.

The CPU 65 is also connected to a keyboard 73 and a mouse 74 serving as a pointing device through the bus 64. Data necessary for image processing can be inputted through the keyboard 73, and points and the like for three-dimensional position measurement or the like can be designated on the monitor 5 by operating the keyboard 73. Also, points on the image required when three-dimensional measurement is performed can be designated by operating the mouse 74.

The CPU 65 computes to set a measuring coordinate system for three-dimensionally determining a position on a surface of the pipe 15 corresponding to a position on an image of the pipe 15, as described below with reference to flowcharts.

Figure 13A:
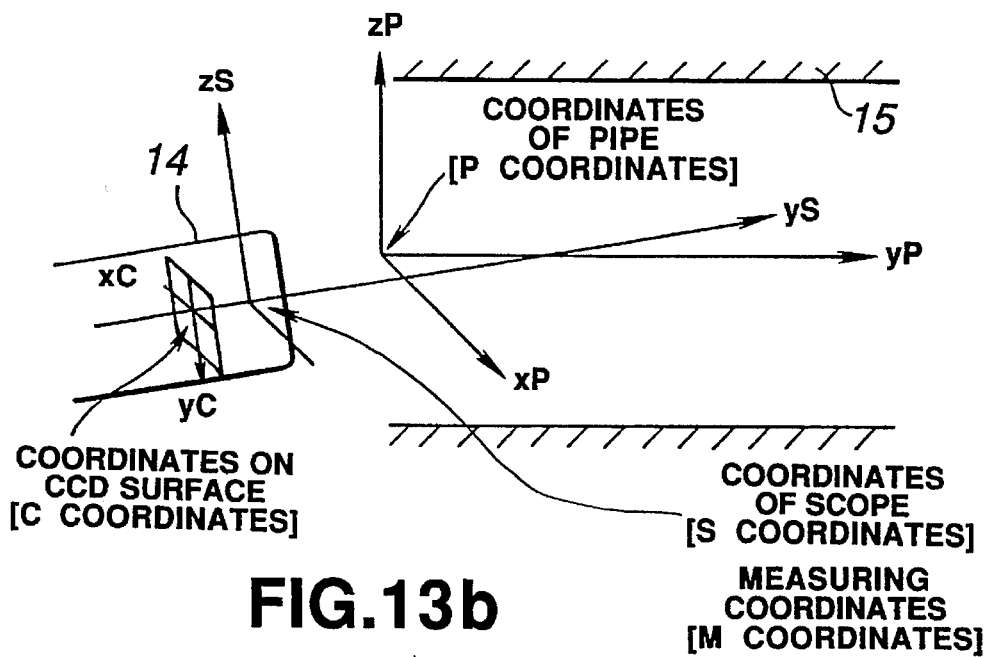
FIGS. 13a to 13c are diagrams of coordinate systems used in this embodiment.
Figure 13B:
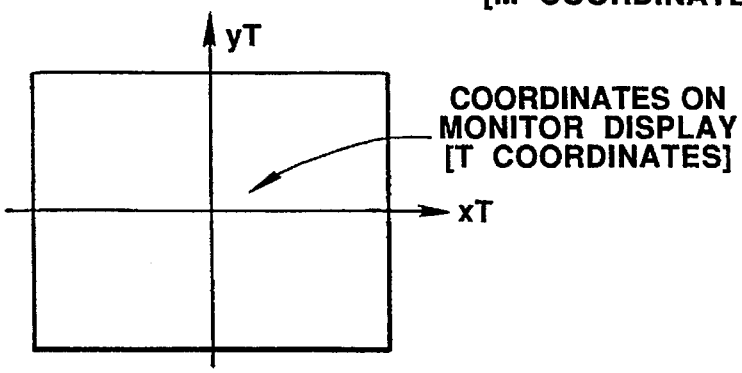
Figure 13C:
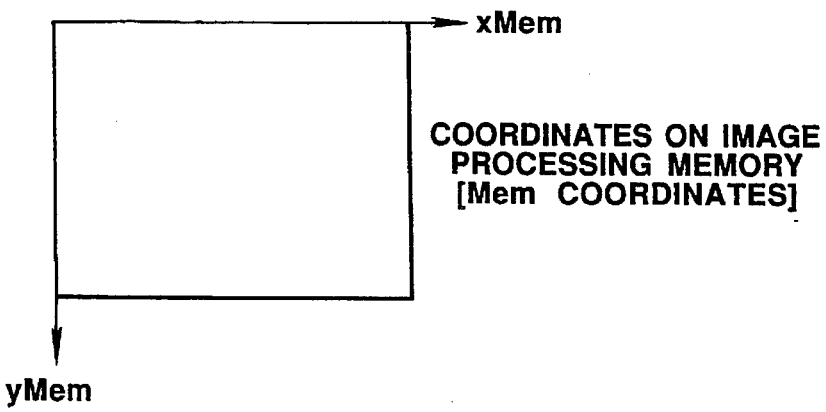

The following is the definition of coordinate systems used for the following description. FIGS. 13a, 13b, and 13c shows these coordinate systems. The coordinate systems shown in FIG. 13a are an S coordinate system fixed on the electronic scope 2 when the internal surface of the pipe 15 is observed with the electronic scope 2, a calculated measuring coordinate system used for measurement (, which coincides with the S coordinate system in FIG. 13A), a C coordinate system fixed on the CCD surface, and a P coordinate system fixed on the pipe 15. The coordinate system shown in FIG. 13b is a T coordinate system on the monitor screen, and the coordinate system shown in FIG. 13c is a Mem coordinate system provided in the image processing memory 68. Characters attached to the symbols representing these coordinate systems represent variables belonging to the corresponding coordinate systems. For example, xS represents an x-coordinate in the C coordinate system.

[P coordinate system] is provided on the pipe and has an yP axis corresponding to the center axis of the pipe.

[S coordinate system] is provided on the scope and has an origin corresponding to a center the observation optical system of the scope and an axis yS corresponding to the center axis of the observation optical system.

[Measurement coordinate system] is a calculated coordinate system used for measurement and, initially, coincides with the S coordinate system. If this coordinate system coincides with the P coordinate system, measurement can be performed correctly. This coordinate system is introduced to relate the S coordinate system and the P coordinate system.

[C coordinate system] is provided on the CCD surface and has an origin corresponding to the center of the CCD surface and an axis xC and an axis yC opposite to the axes xS and yS of the S coordinate system.

[T coordinate system] is a coordinate system in the frame memory 62. This coordinate system coincides with a coordinate system provided on the monitor screen for observation and has an original which, for example, corresponds to the center of the image frame.

[Mem coordinate system] is a coordinate system in the image processing memory 68 having an origin corresponding to a left-top point of the T coordinate system.

In the thus-defined coordinate systems, if, for example, the fore end of the scope is moved so that the S coordinate system coincides with the P coordinate system, an image of the pipe 15, such as that shown in FIG. 7, is observed. In a case where a defect is observed in this observed image from a point P1 of a viewed angle θ1 to a point P2 of a viewed angle θ2, the length from the point P1 to the point P2 can be easily measured by calculation shown below, on condition that the diameter D of the pipe 15 and the focal length f of the optical system is known. Details of the calculation will be described later.

For example, if orthogonal coordinate x- and z-axes are set on the observed image surface with an origin O corresponding to a vanishing point BP as shown in FIG. 7 (y-axis extending in a direction perpendicular to the plane of FIG. 7), and if an angle xOP1 is α, the y-coordinate yOS of the point P1 can be obtained by using equations (1), (7) and (8) described later.

If an equation (2) or (4) is used, x- and z-coordinates (xS, zS) of the point P1 can be obtained and three-dimensional x-, y- and z-coordinates (xS, yS, zS) of the point P1 are determined. Accordingly, the length from the point P1 to the point P2 can be obtained by calculating a square root of the sum of squares of the coordinate components if the length is measured along a straight line. In the case of measurement along a curved line, the line may be divided into segments. The overall length can be obtained as the sum of the lengths of the segments. If the length (distance) between two points can be obtained, any area can also be calculated (measured).

Accordingly, if the coordinate system of the scope is set so as to coincide with the coordinate system of the pipe, three-dimensional coordinates of any point on the inner surface of the pipe can be obtained from the observed image alone (only by using known information on the pipe and the optical system without using an auxiliary means), and spatial dimensions such as length and area can easily be obtained.

To make the coordinate system of the scope coincide with the coordinate system of the pipe, the scope may be actually moved so as to coincide with the coordinate system of the pipe, or the measuring coordinate system, which is initially set as the same coordinate system as the scope coordinate system, may be converted and finally made to coincide with the coordinate system of the pipe.

A process of making the coordinate system of the scope with the coordinate system of the pipe will be described below.

Figure 14:
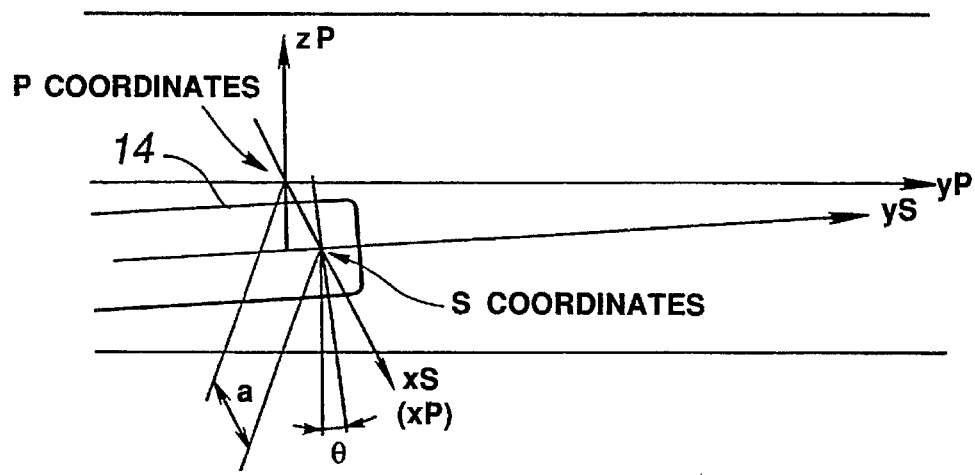
Figure 15:
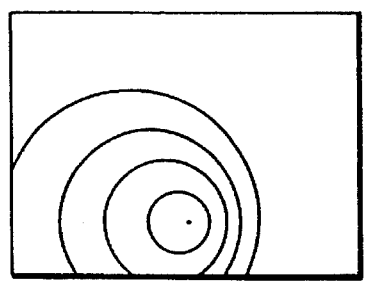

The description will be given of an image in a case where the scope 2 is placed in an arbitrary position in the pipe 15. However, for ease of description, the arbitrary position is limited to a position such that, as shown in FIG. 14, the scope 2 (the center axis of the observation optical system of the scope 2) is shifted from the pipe 15 (center axis of the pipe 15) by a along the x-axis and is rotated through θ about the x-axis.

In this case, the image is formed in such a manner that the most remote point (vanishing point) of the pipe 15 is moved from the center of the image frame toward the bottom side, and that the center of a circle formed by an equi-brightness line is shifted from the vanishing point to the left to the extent corresponding to a.

As described above, if the origin of the S coordinate system is placed at the coordinate center O of the optical system, a change in image when the scope 2 is moved by being rotated relative to the pipe 15 and a change in image when the scope 2 is translated can be detected independently. That is, three-dimensional coordinates of the scope 2 with respect to the pipe 15 can be calculated from data from the obtained image alone. (However, known data, e.g., the inside diameter of the pipe 15, is used.)

Figure 16:
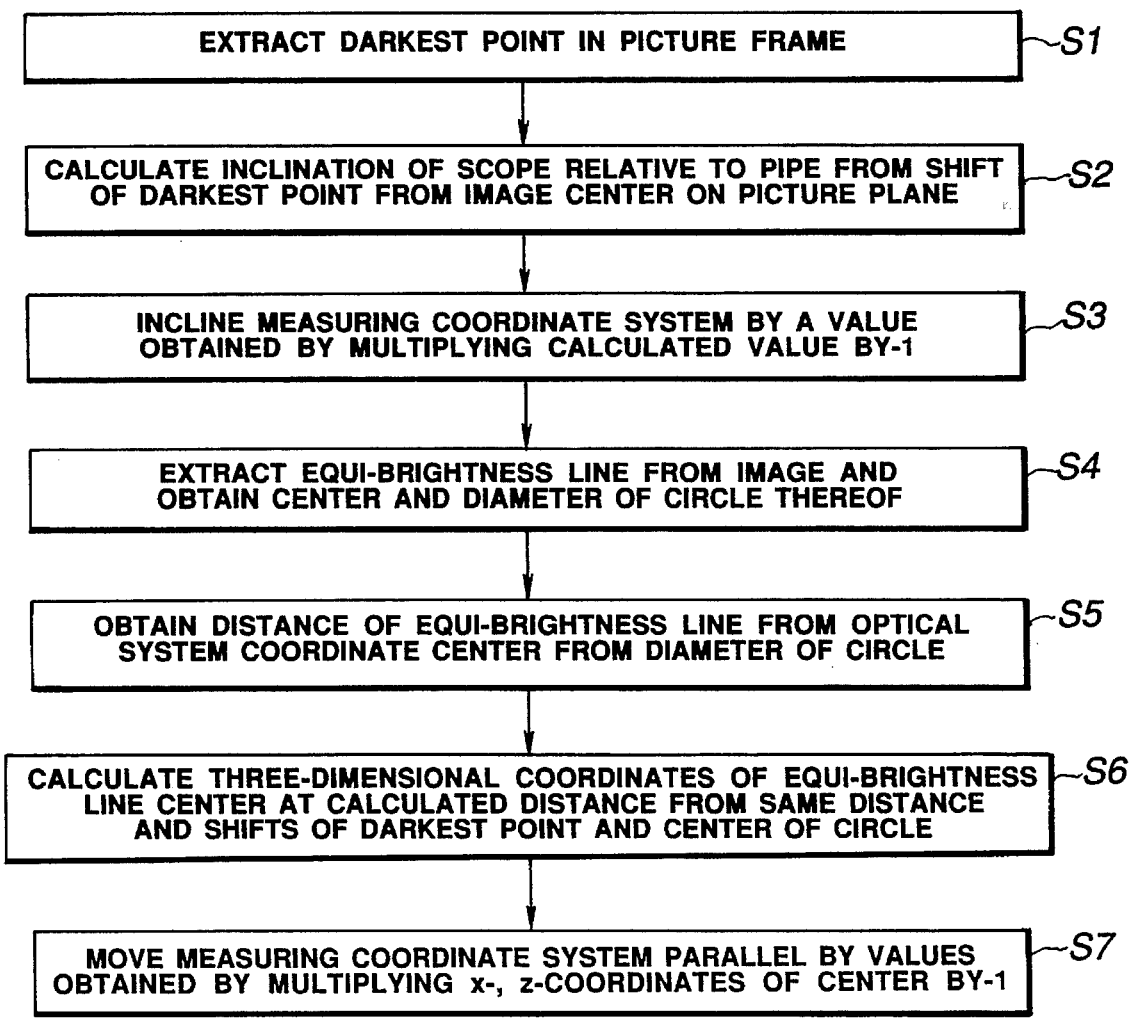

FIG. 16 is a flowchart of an actual calculation procedure when the origin of the S coordinate system is set to the coordinate center O of the optical system.

A practical calculation process in accordance with steps of the flowchart will be described below.

The C coordinate system on the CCD 25 and the T coordinate system on the monitor screen correspond to each other in a one-to-one relationship. If a point in the T coordinate system on the monitor screen is designated, for example, with a cursor by the operation of mouse 75 or the like, the designated point in the T coordinate system is converted into a point in the C coordinate system by a relational expression (xT, yT)→(-axT, byT) for conversion from the T coordinate system to the C coordinate system. Constants a and b represent scale factors.

Accordingly, in the following description, the process will be described with respect to points in the C coordinate system on the CCD image frame without discriminating points on the monitor screen from the corresponding points on the CCD 25.

FIG. 17 shows the coordinate systems used for the following description. In FIG. 17, SOO denotes a point existing on the pipe center axis at an arbitrary distance yOS from the fore end of the scope (in the direction of the center axis of the optical system);

SO denotes a point existing on the center axis of the optical system at the same distance yOS;

COO denotes a point in the C coordinate system corresponding to SOO;

CO denotes a point in the C coordinate system corresponding to SO;

hC denotes the distance between CO and COO;

hS denotes the distance between SO and SOO;

θS denotes an angle between SO and SOO about the origin O, i.e., an incident angle of a ray of light, which is equal to the angle of rotation of the scope;

f denotes the focal length of the optical system; and

D denotes the diameter of the pipe.

In step S1 shown in FIG. 16, a darkest point in the image frame is first extracted. A remotest point on the pipe 15 is observed as a darkest point in an observed image (vanishing point).

Details of an image processing method for extracting a darkest point in an image will be described later. As this method, a method ordinarily used for digital image processing may suffice. The darkest point is indicated by COO.

Next, in step S2 shown in FIG. 16, the inclination of the scope 12 relative to the pipe 15 is calculated from the shift of the darkest point from the image (image frame) center on the image plane. A reference symbols in FIG. 17 denotes the height of the image on the CCD surface.

The following relationship is established between the incident angle of the incident ray and the image height. This relational expression is determined from the optical system used.

$$hC = f \cdot \sin \theta S / \text{dist} \tag{1}$$

θS can be obtained from this equation. That is, the angle of rotation of the scope 2 on the center of the optical system relative to the pipe 15 can be detected. In other words, if the y-axis of the measuring coordinate system of the scope 2 is inclined by this angle, the measuring coordinate system becomes parallel to the coordinate system of the pipe 15.

Since the angle θS is a composite of the rotations on the x- and z-axes of the S coordinate system, it is necessary to distribute the rotation of the scope 2 into the rotations on the x- and z-axes of the S coordinate system by using an angle α between the segment CO-COO and the x-axis in the C coordinate system.

$$\alpha = \arccos hxC/hC \qquad (2)$$

$$hxS = hS \cdot \cos \alpha \qquad (3)$$

$$hzS = hS \cdot \sin \alpha \qquad (4)$$

$$\theta xS = \arctan hzS/yOS = \arctan (hS \cdot \sin \alpha/yOS) \qquad (5)$$
$$= \arctan (\tan \theta S \cdot \sin \alpha)$$

$$\theta zS = -\arctan hxS/yOS = -\arctan (hS \cdot \cos \alpha/yOS) \qquad (6)$$
$$= -\arctan (\tan \theta S \cdot \cos \alpha)$$

By these equations, the angle of rotations θxS and θzS on the two axes can be calculated.

In step S3, the measuring coordinate system is inclined by values determined by multiplying the calculated inclination by −1. That is, the measuring coordinate system is rotated by θxS about the x-axis and θzS about the z-axis.

By these rotations, the measuring coordinate system becomes a coordinate system corrected from the state corresponding to the scope coordinate system (i.e., the state of the scope being shifted rotationally and translationally relative to the pipe) with respect to the state of being rotationally shifted. In other words, by step S3, the measuring coordinate system becomes a coordinate system in a state of being translationally shifted relative to the pipe.

Then, in step S4, an equi-brightness line is extracted from the image, and the center and the diameter of a circle formed by the line are determined.

Image processing for the equi-brightness line extraction is not described in detail here.

First, points of a substantially middle brightness in the image frame are extracted.

A circle is extracted by two-valuing and smoothing processing.

The circumference of the circle is detected by matching of a circle having a known size with the extracted circle or by extracting the maximum and minimum of x- and y-coordinates of the extracted circle to determine the diameter and the center position of the circle.

In step S5, the distance yOS of the equi-brightness line from the coordinate center of the optical system is obtained from the diameter of the circle.

Figure 18:
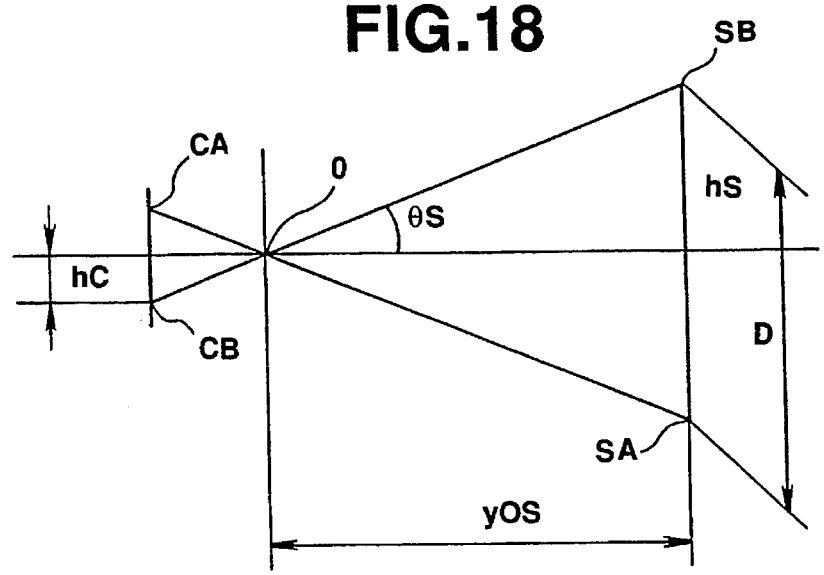

In a case where the center axis of the optical system and the center axis of the pipe coincide with each other as shown in FIG. 18, yOS can be calculated by equation (1) and the following equations:

$$hS = yOS \cdot \tan \theta S \qquad (7)$$

$$D = 2 \cdot hS \qquad (8)$$

if hC is known.

Figure 19:
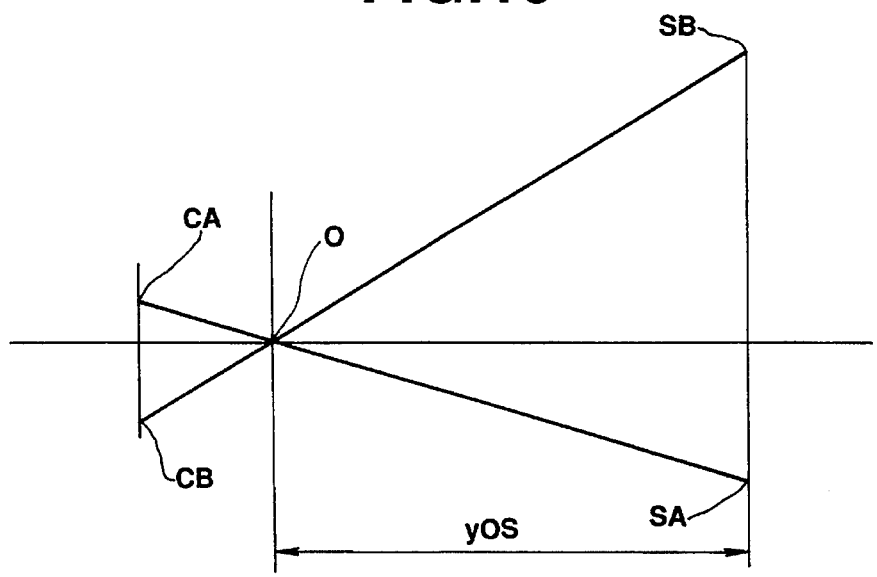

Also in a case where the center axis of the optical system is translated as shown in FIG. 19, the angle SA-O-SB can be regarded as the same as that in the case shown in FIG. 18, and the distance yOS can be calculated in the same manner.

Similarly, an error can be ignored in a case where the center axis of the optical system is rotationally shifted. In such a case, however, an equi-brightness line does not form a circle but forms an ellipse when imaged on the CCD surface.

In Step S6, three-dimensional coordinates of the center of the equi-brightness circle at the distance yOS are calculated from the same distance and shifts of the darkest point and the center of the equi-brightness circle.

Let the darkest point in the image frame correspond to CO and let the center of the circle of the equi-brightness line at the distance yOS be CP, as shown in FIG. 20.

The point at the distance yOS in the measuring coordinate system corresponding to CO in the C coordinate system is SO.

Since it is known that the center point SP of the equi-brightness line in the measuring optical system is located at the distance of yOS, the three-dimensional position of SP in the measuring coordinate system can be calculated from the shift hC between the CP and CO in the C coordinate system. That is, the viewed angle θS can be determined from equation (1), and three-dimensional coordinates of a point at which a ray emergent at the angle θS intersects a plane located at the distance yOS and perpendicular to the y-axis may be obtained.

In step S7, the measuring coordinate system is translated by values obtained by multiplying x- and z-coordinates of the center by −1.

Figure 20A:
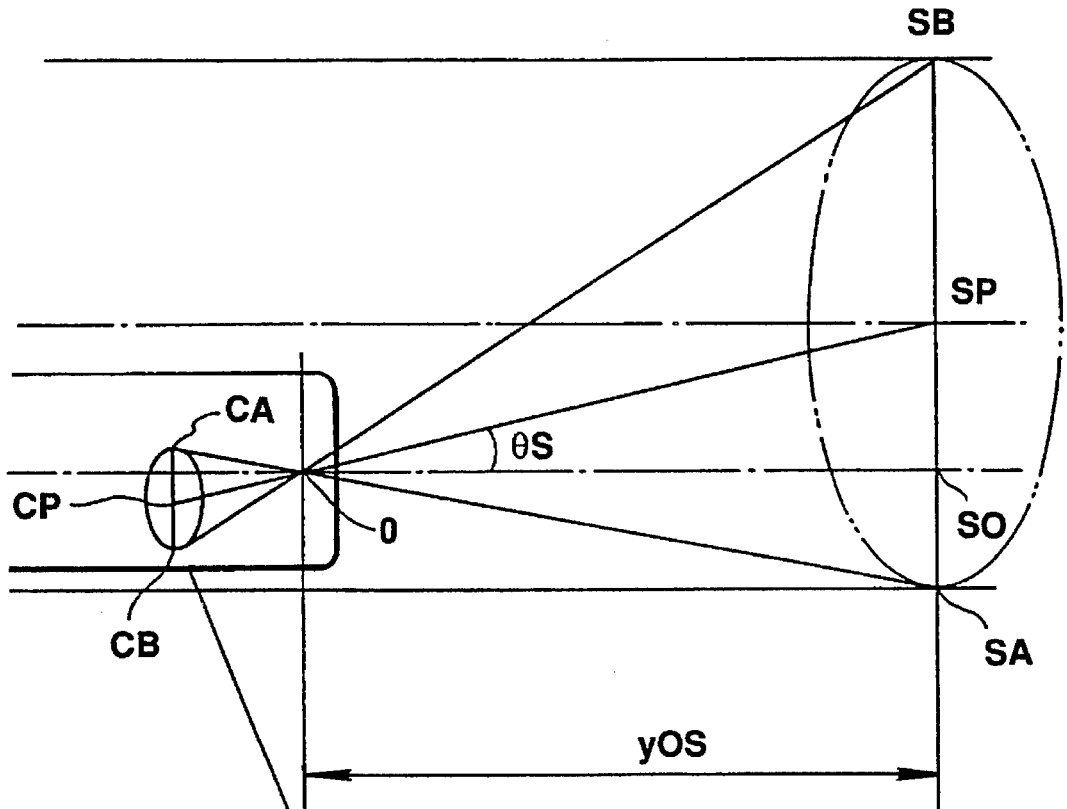
FIGS. 20(a)–20(b) are a diagram of a state in which the measuring coordinate system is translated so as to coincide with the pipe coordinate system.
Figure 20B:
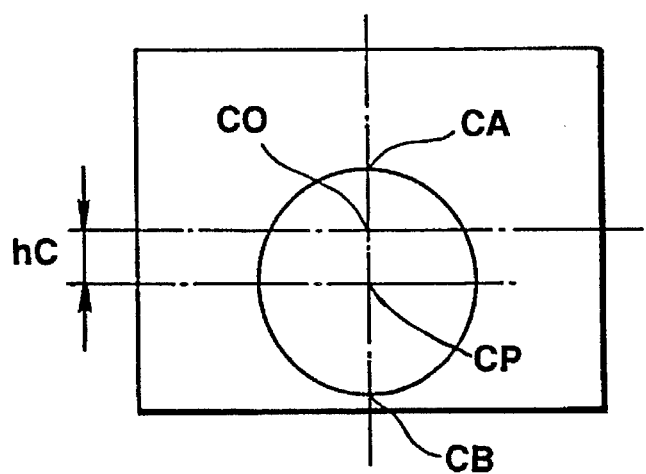

As can be understood from FIGS. 20(a)–20(b), the center axis of the measuring coordinate system extends through SO, and the center axis of the pipe extends through SP. That is, the measuring coordinate system can coincide with the pipe coordinate system if it is translated to the extent corresponding to the shift between SO and SP.

If the coordinates of SP in the measuring coordinate system are (xS, yOS, and zS), the x-coordinate and the z-coordinate of the measuring coordinate system are changed by -xS, and -zS, respectively.

By the above-described process, the measuring coordinate system can be made to coincide with the P coordinate system.

If one point in the observed image frame is designated, corresponding one set of coordinates of the pipe surface in the measuring coordinate system is determined. Three-dimensional coordinates of the point in the observed image frame are calculated therefrom.

If two points are designated, the distance between two points on the pipe surface can be calculated. For example, in a case where a defect in the form of a straight line is observed on the pipe surface, two ends of the defect may be designated on the display screen 5A of the monitor 5 to detect (calculate) the length of the defect. In the case of a defect in the form of a curved line, a plurality of points may be designated along the defect to detect (calculate) the length of segments between each pair of adjacent points. The length of the curved defect can be calculated as the sum of the lengths of the segments.

If three points are designated, the area on the pipe surface surrounded by the three points can be calculated. Accordingly, if a defect extends three-dimensionally, the area thereof can be calculated. If the shape of a defect is not triangular, a multiplicity of points may be designated to calculate the area of the two-dimensional defect as the sum of the areas of small triangles.

According to this first embodiment, three-dimensional position information corresponding to any point on a pipe can be obtained from an image of the pipe by using known information, and a three-dimensional length, a three-dimensional area and the like can be easily calculated by using this three-dimensional position information. Thus, desired quantities can be easily measured, and the present invention can be applied to existing endoscopes having no auxiliary measuring mechanism or the like.

The use of such endoscopes can be extended by adding a measuring unit according to the need to measure a three-dimensional position. Thus, a flexible measuring system can be constructed.

Figure 21:
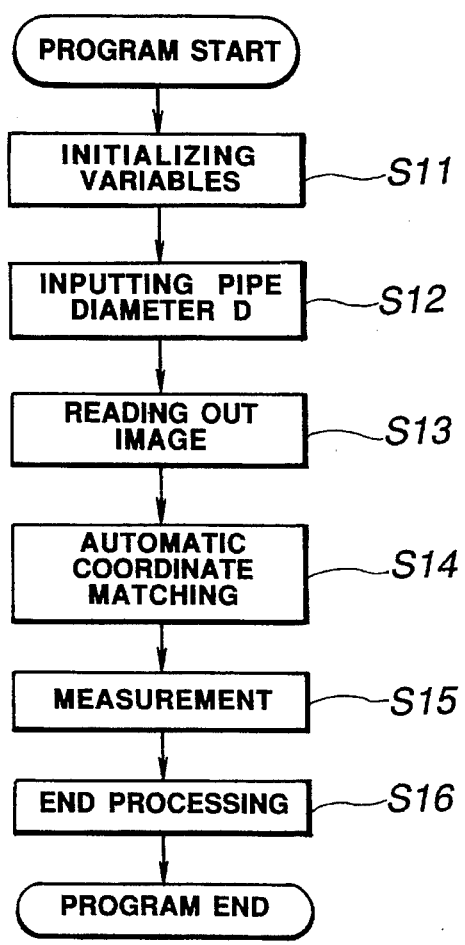

The three-dimensional measuring process will be described more concretely with reference to flowcharts of FIG. 21 and other figures. FIG. 21 shows a flowchart of a program for performing three-dimensional measurement. First, in step S11 of the program, variables necessary for calculation are initialized. In step S12, the pipe diameter D is inputted.

That is, a graphic image enabling an operator to input the diameter of a pipe to be measured is displayed, and data on the pipe diameter inputted by a data inputting operation through the keyboard is fetched. Then, in step S13, image reading processing is performed.

Figure 22:
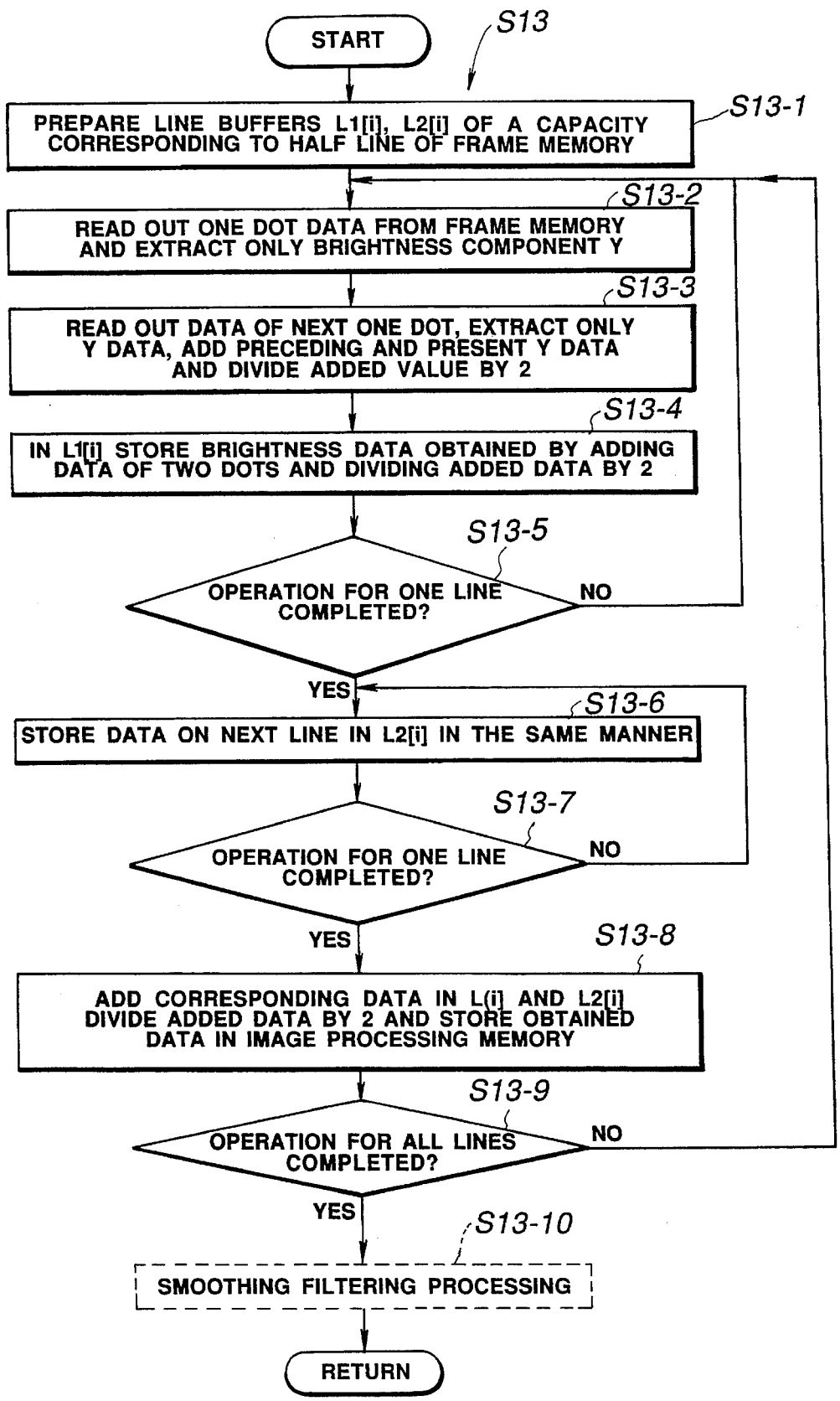

FIG. 22 shows this image reading processing. In the image reading processing shown in FIG. 22, image data is compressed and averaged. The processing time is reduced by compressing image data, and the influence of noise is reduced by averaging the image data. Image data may be simply read out of the frame memory without being compressed and averaged.

In step S13-1 shown in FIG. 22, two line buffers (L1[i], L2[i]) of a capacity corresponding to half of one line data in the frame memory 62 are prepared in the RAM 67.

Data is moved to these line buffers while being compressed so that the number of dots for one line is reduced to half.

That is, in step S13-2, data corresponding to one dot is read out of the frame memory 62. A chroma (color) signal and a Y (brightness) signal are recorded as upper 8 bits and lower 8 bits, respectively, in the frame memory 62. Therefore, only the lower 8 bits used for this processing are extracted. Actually, the upper 8 bits are set to 0.

Next, in step S13-3, an adjacent point is read in the same manner. The preceding Y data and the present Y data are added and the sum of them is divided by 2. In step S13-4, the data thereby obtained is stored in a first-dot area of the line buffer L1[i]. In step S13-5, a determination is made as to whether these operations have been performed for one line. The processing is repeated until data for one line is completely processed.

In this manner, the steps of forming one dot having an average brightness from two dots of the frame memory 62 and storing it in the line buffer are repeated so that data for one line is compressed to half.

In steps S13-6 and S13-7, data on the next line is processed in the same manner and obtained data is stored in the line buffer L2[2].

In step S13-8, after data for two lines has been stored, data items at the same positions in the lines are added and the sum is divided by 2, and the data thereby obtained is stored in the image processing memory 68. This operation is repeated for one line. In step S13-9, determination is made as to whether the processing has been performed with respect to all lines. This processing is repeated until all lines are processed.

A ¼ thinned-out image having data averaged from data on four dots in vertical and horizontal directions is obtained in this manner, and the result of the processing is stored in the image processing memory 68, thereby completing the image reading processing. For convenience of subsequent image processing, smoothing filtering processing may be performed after the step S13-9, as indicated by the dotted line. As this smoothing filtering processing, non-linear processing with median filter of 3 * 3, 4 * 4, 5 * 5 or the like may be adopted.

After the completion of this processing, the process proceeds to automatic coordinate matching processing in the next step, i.e., step S14 shown in FIG. 21.

Figure 23:
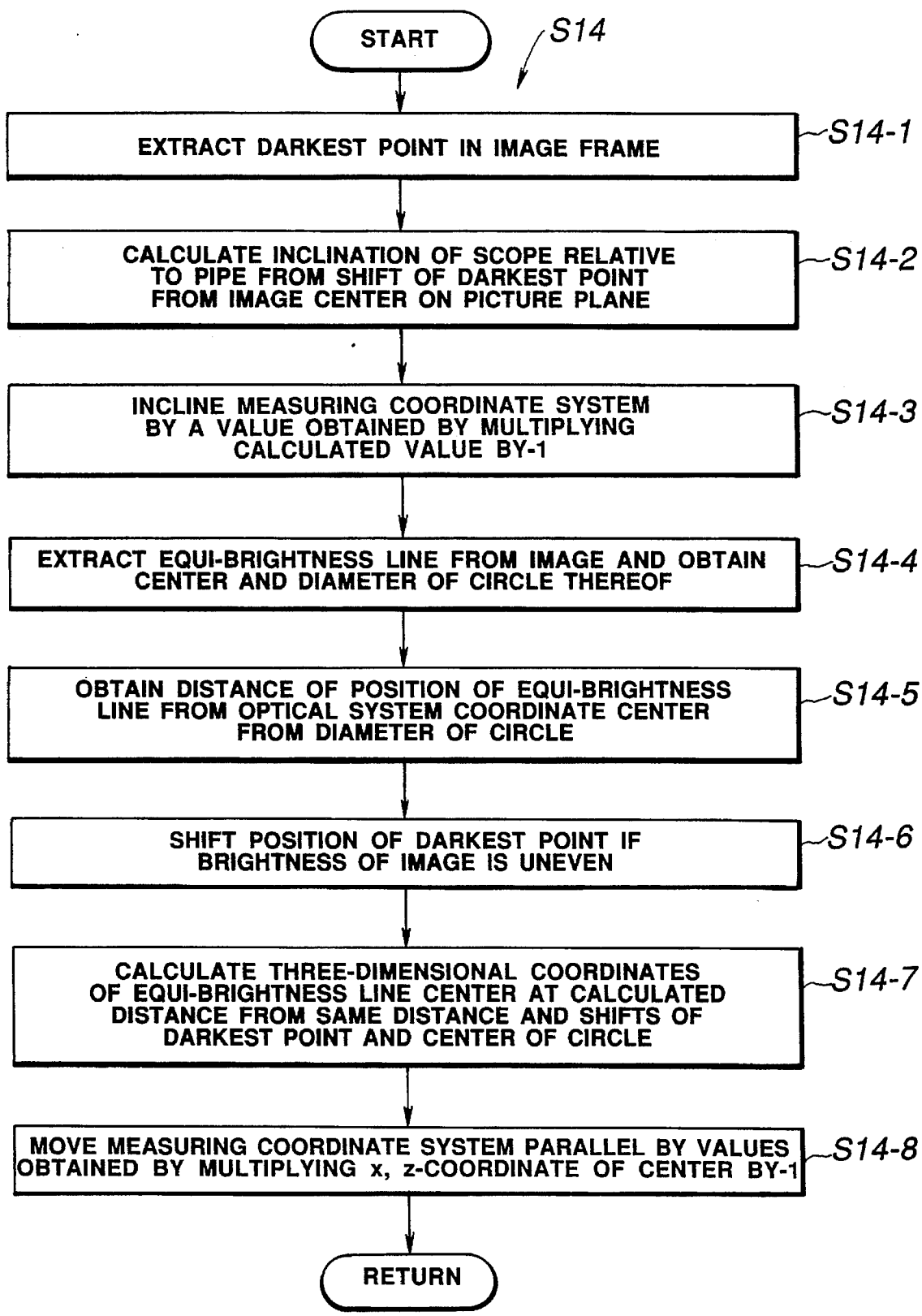

The automatic coordinate matching processing will be described below. This processing is coordinate matching processing for making the measuring coordinate system set to the scope coordinate system coincide with the pipe coordinate system. This processing is performed on the image processing memory 68 by the CPU 65. FIG. 23 shows a flowchart of the automatic coordinate matching processing.

In the first step S14-1 of this processing shown in FIG. 23, a darkest point in the image frame is extracted. The content of this processing is as shown in FIG. 24.

Figure 24:
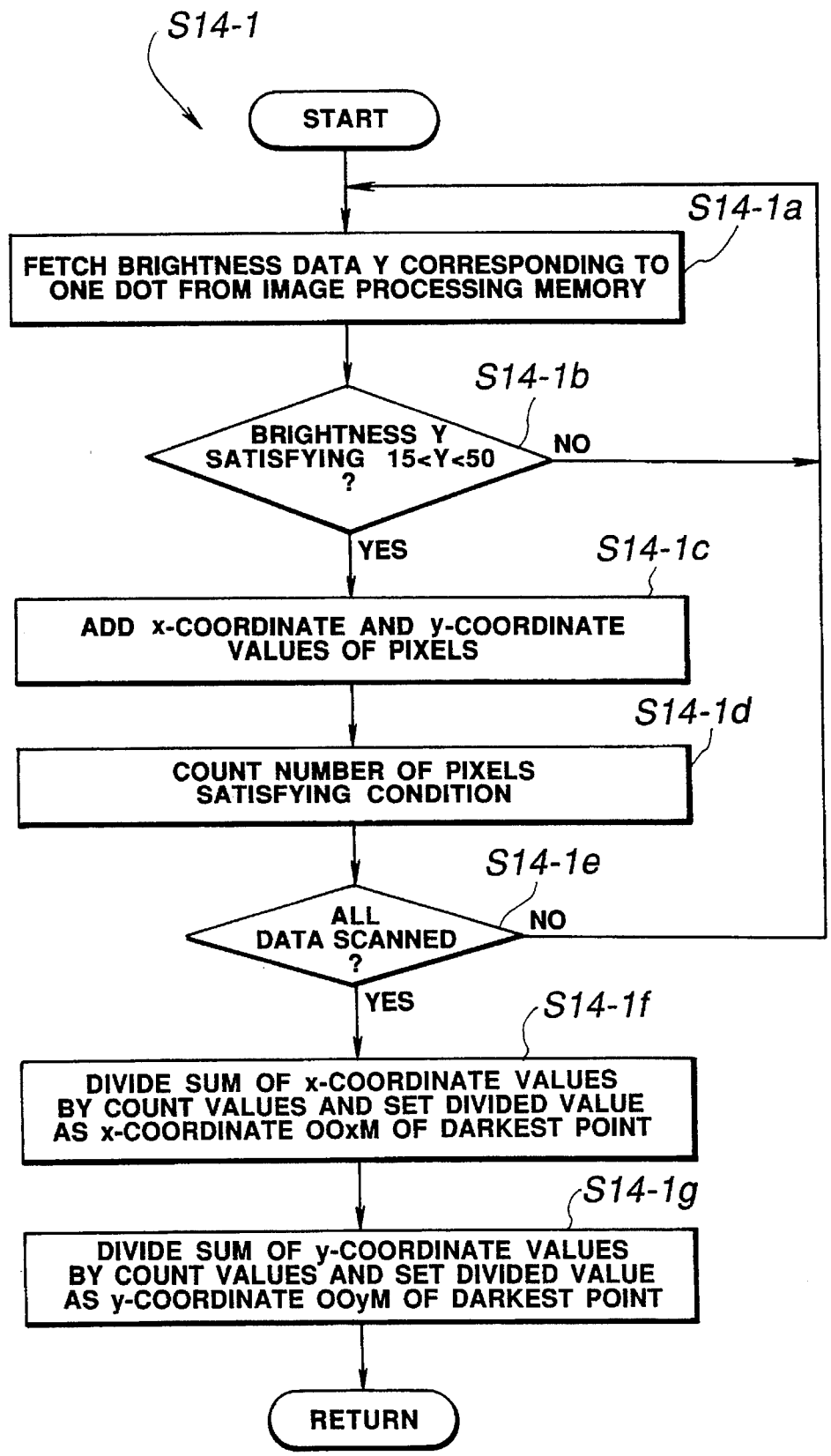

Processing from step S14-1a to S14-1e shown in FIG. 24 is performed. First, in step S14-1a, brightness data for one dot is fetched from the image processing memory 68. In step S14-1b, determination is made as to whether the brightness Y is within the range of 15 to 50 in 8-bit gradations (0–255) to find points having brightness within this range. If there are some points satisfying the condition, x- and y-coordinate values of the points are extracted and added, in step S14-1c. Simultaneously, the number of pixels thereby added is counted in step S14-1d. A determination shown in step S14-1e is made and this processing is repeated until all data is processed.

After all the points in the image processing memory 68 have been scanned, the sum of x-coordinates and the sum of y-coordinates are divided by the count value in steps S14-1f and S14-1g. That is, a centroid of a figure satisfying the condition is obtained.

This centroid is set as OO (00xM, 00yM). This point coincides with the darkest point.

Figure 25:
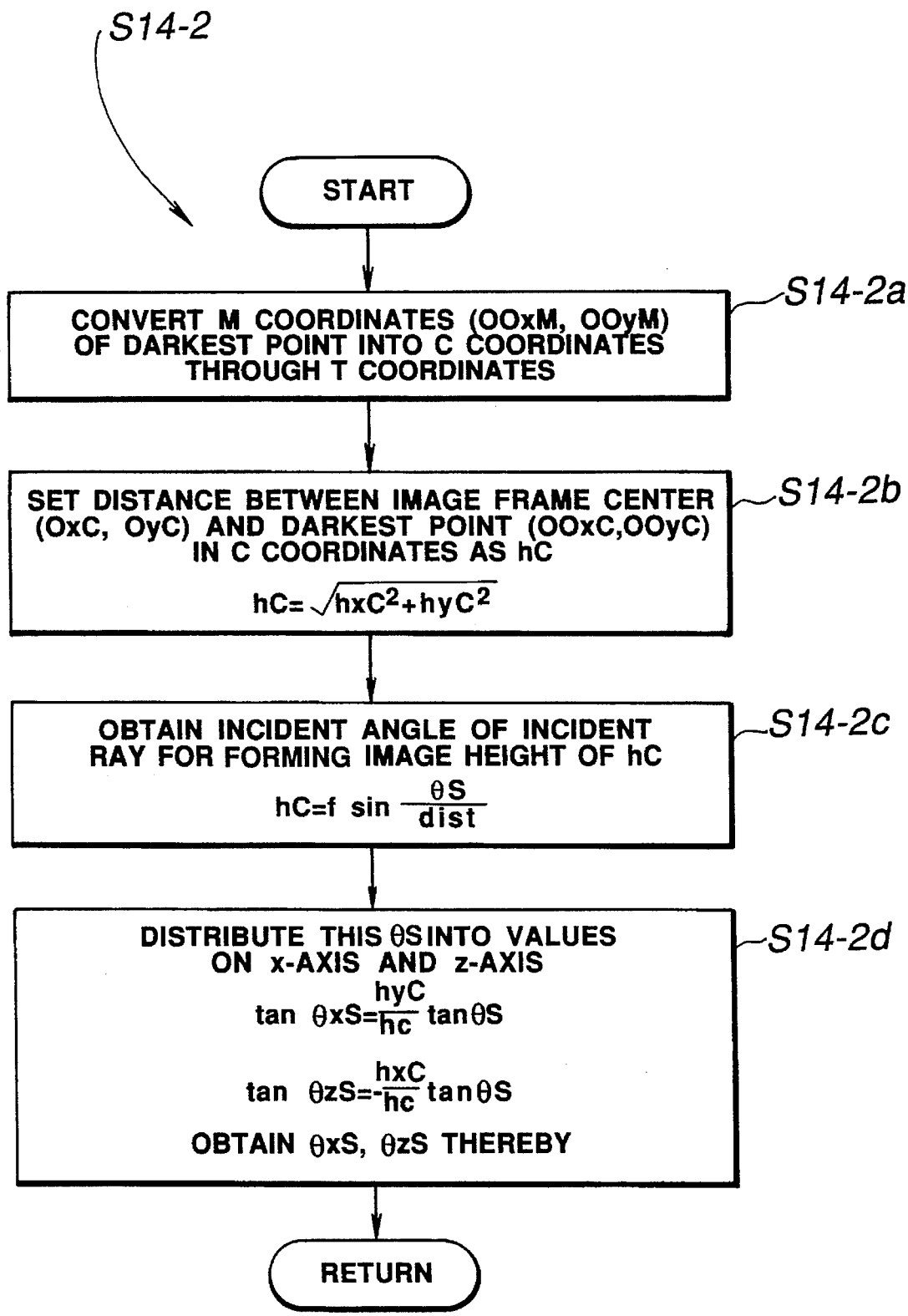

In step S14-2 shown in FIG. 23, the inclination of the scope relative to the pipe is calculated from the shift of the darkest point from the image (image frame) center on the image plane. FIG. 25 shows a flowchart of a process for this calculation. This process is schematically shown in FIG. 17.

To calculate the inclination, the darkest point OO in the M coordinate system is converted into a point in the T coordinate system and is further converted into a point in the C coordinate system.

In step S14-2b, the distance between the center O (0x,C, 0yC) of the image frame and the darkest point OO is set as hC.

$$hC \cdot hC = (00xC - 0xC) \cdot (00xC - 0xC) + (00yC - 0yC) \cdot (00yC - 0 yC)$$

In step S14-2c, the incident angle θS at which an incident ray is introduced to define the image height hC is obtained. That is, $$hC = f \cdot \sin \theta S / \text{dist}$$

where f represents the focal length of the optical system and dist represents a distortion correction coefficient.

In step S14-2d, the object height is distributed into values on the x- and z-axes of the S coordinate system since it is not expressed by x- and z-coordinates in the S coordinate system. For the distribution, the image inclination angle α in the C coordinate plane is used. θxS and θzS are obtained by the equations shown in FIG. 17.

Figure 26:
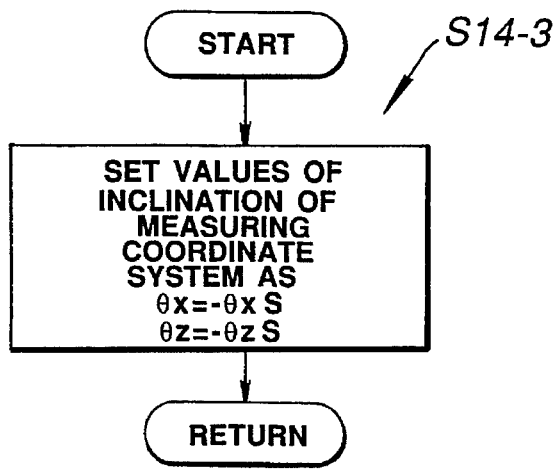

FIG. 26 shows the operation of inclining the measuring coordinate system by values determined by multiplying the calculated inclination by −1 in step S14-3 shown in FIG. 23. That is, the measuring coordinate system thereby has angles -θxS and -θzS in terms of the angle of inclination θx and θz about the x- and z-axes of the S coordinate system.

The process of extracting an equi-brightness line from an image and determining the center and the diameter of the circle formed by the equi-brightness line as in step S14-4 shown in FIG. 23 will be described below with reference to FIGS. 27 to 29. FIGS. 27a to 27d relate to a method of obtaining the brightness to extract an equi-brightness circle from an image, FIG. 28 shows a flowchart of the process of extracting an equi-brightness line from an image to determine the center and the diameter of the corresponding circle, and FIG. 29 relates to a method of determining the center of an equi-brightness circle from a set of points of a certain brightness.

Figure 27A:
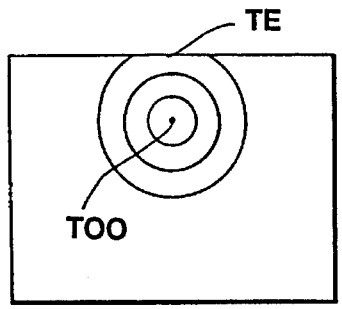
FIGS. 27a to 27d are diagrams of an operation of obtaining a brightness to extract an equi-brightness line from an image.
Figure 27B:
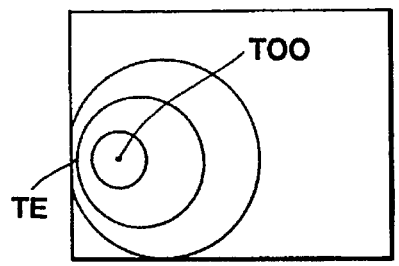
Figure 28:
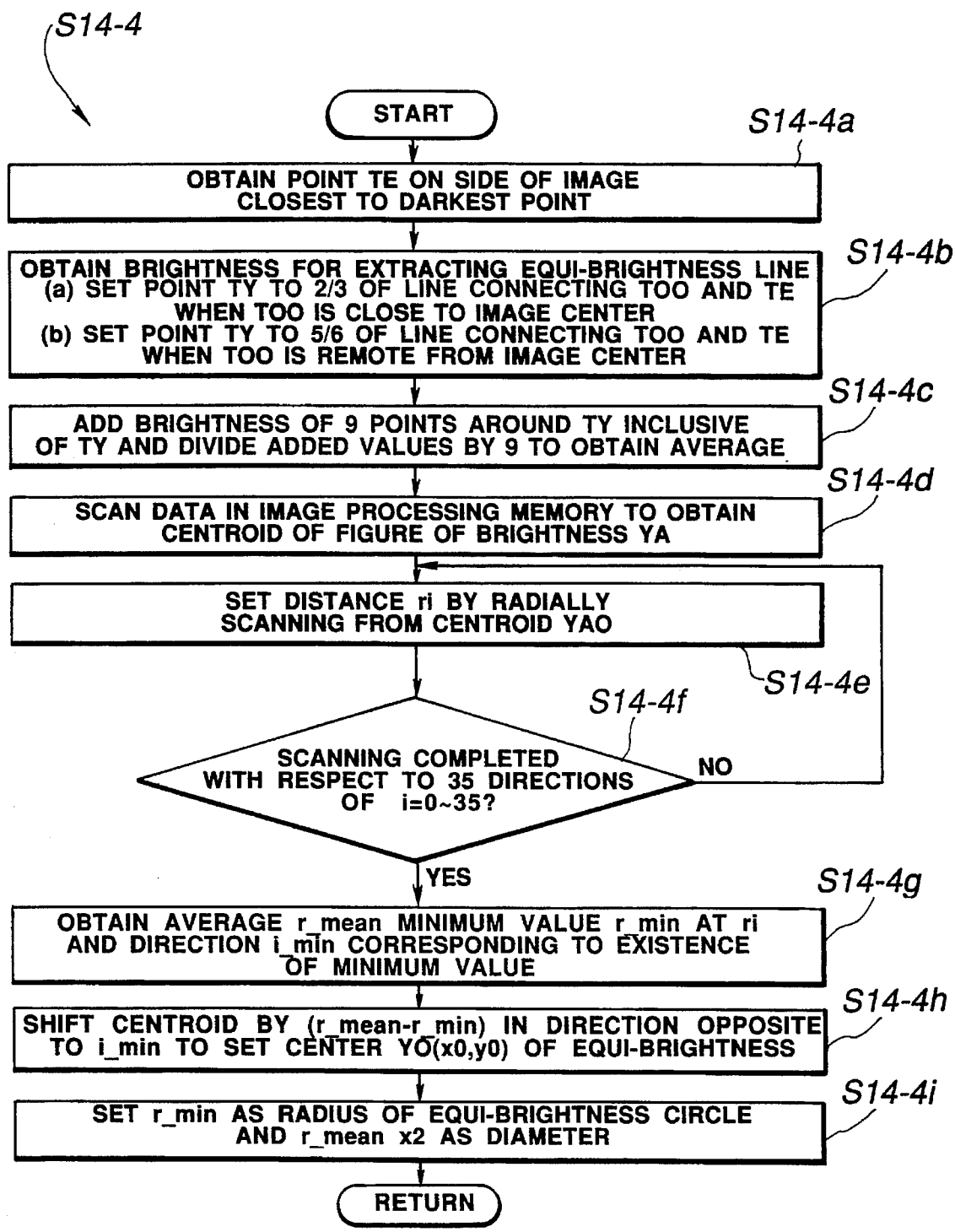

In the first step S14-4a shown in FIG. 28, a point TE on a side of the image closest to the darkest point TOO is obtained. For example, the point TE is a point on a top side of the image frame in the case of an image shown in FIG. 27a, or a point on a left side in the case of an image shown in FIG. 27b.

Figure 27C:
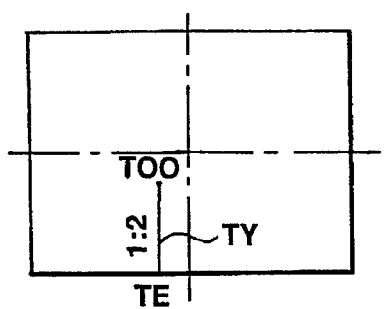
Figure 27D:
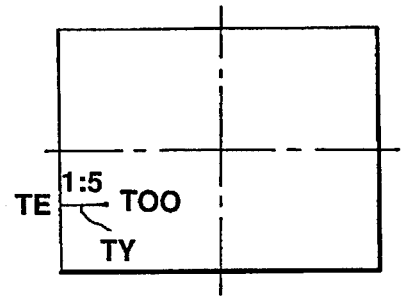

In step S14-4b shown in FIG. 28, a brightness at which an equi-brightness line is extracted is determined. If TOO is close to the image center as shown in FIG. 27c, the brightness at a point TY interiorly dividing the line connecting TOO and TE at 1:2 is set as a brightness at which an equi-brightness line is extracted. If TOO is remote from the image center as shown in FIG. 27b, a point interiorly dividing the corresponding line at 1:5.

In step S14-4c shown in FIG. 28, brightness values of 8 points around the point TY and a brightness of the point TY are added and the sum of these brightness values is divided by 9. That is, the brightness around the point TY is averaged. The average brightness thereby obtained is set as brightness YA. This operation also is performed with respect to the Mem coordinate system. In step S14-4d shown in FIG. 28, a centroid YOA of a figure having the same brightness as the brightness YA by scanning the image processing memory 68. The figure having the same brightness as YA corresponds to an equi-brightness circle.

In step S14-4e shown in FIG. 28, the distance ri from YAO to the point of brightness YA is determined by radially scanning therefrom. In step S14-4f shown in FIG. 28, determination is made as to whether scanning has been completed with respect to 36 directions from i=0 to i=35. The same processing is repeated with respect to 36 directions. A set of points of brightness YA is obtained by radial scanning from YAO, as shown in FIG. 29.

In step S14-4g shown in FIG. 28, an average r_means and a minimum r_min are obtained from 36 distances (radiuses) ri, and a direction i_min in which the point of the minimum r_min exists is also obtained.

Figure 29:
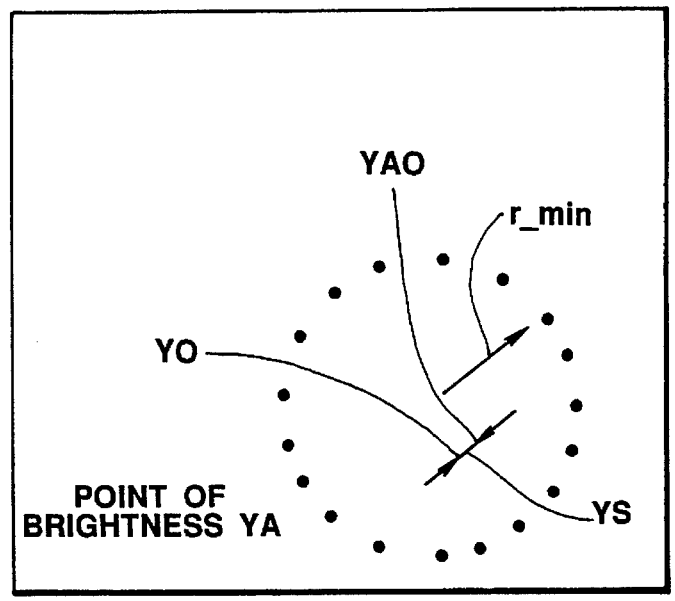

In step S14-4h shown in FIG. 28, the centroid YAO is moved by YS defined by subtracting the minimum value from the average value in a direction opposite to the direction in which the point of the minimum radius exists, as shown in FIG. 29. The point to which the centroid YAO is moved is set as a center YO of the equi-brightness circle.

In step S14-4i shown in FIG. 28, the average r_means is set as the radius of the equi-brightness circle, and the value which is twice the average r_means is set as the diameter. The processing of step S14-4 is thus completed.

Next, in step S14-5 shown in FIG. 23, the distance of a position at which the equi-brightness line exists from the S coordinate center of the optical system (the origin of the S coordinate system and the P coordinate system) is calculated from the diameter of the equi-brightness circle. This calculation is shown in FIGS. 30 and 31.

Figure 30:
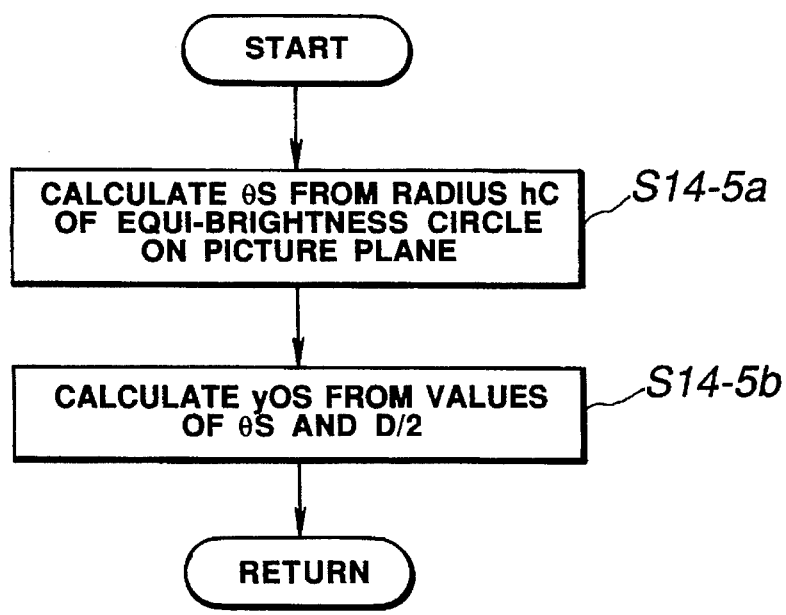
Figure 31:
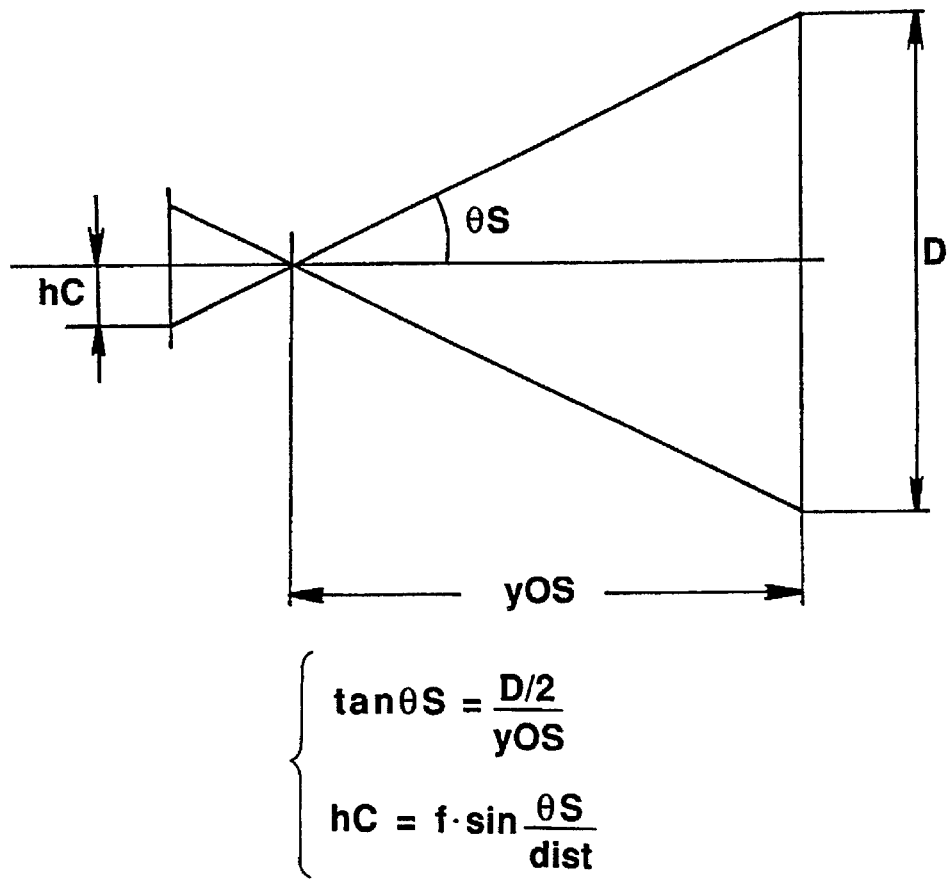

In the first step S14-5a shown in FIG. 30, the incident angle θS defining the image height hC corresponding to the radius of the equi-brightness circle on the image plane is calculated. Equations for this calculation are shown in FIG. 31.

Since a ray incident at this incident angle travels from internal pipe surface, the object height must be D/2.

In step S14-5b shown in FIG. 30, the distance to the equi-brightness circle is obtained by using the incident angle θS and the object height hC. The distance to the equi-brightness circle can be obtained from the equations shown in FIG. 31.

Actually, in this case, the center of the equi-brightness circle does not coincide with the coordinate center axis, and an error is therefore caused in the case of calculation at a position corresponding to the radius. In the case of calculation using the diameter, however, no error is caused even if the center of the equi-brightness circle is shifted from the image center. Thus, the distance can be calculated by the equations shown in FIG. 31.

The process of shifting the position of the darkest point as in step S14-6 shown in FIG. 23 in a case where the brightness over the area of the image frame is uneven will be described below with reference to FIGS. 32, 33, and 34.

Figure 32A:
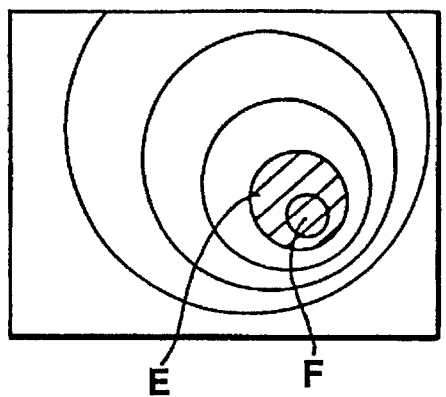
FIG. 32a and 32b are diagrams of a method of determining a darkest point.
Figure 32B:
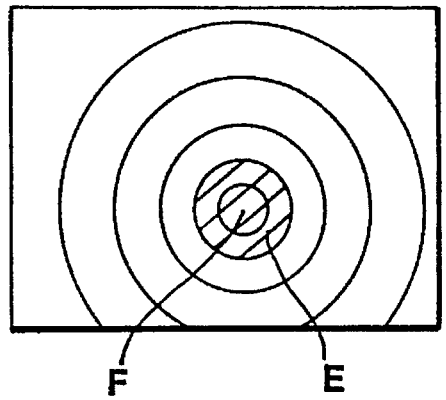
Figure 33:
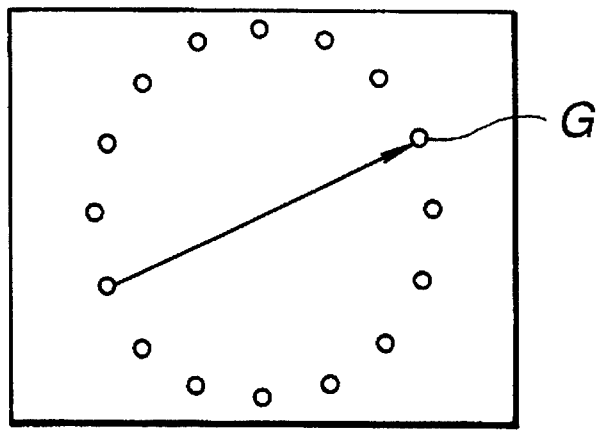

If a lower right portion of the image frame area is brighter than a higher left portion as shown in FIG. 32a, a dark area from which a darkest point is extracted is defined in the hatched region E. The darkest point is recognized as a point coinciding with the centroid of the region E. Therefore, it is located substantially at the center of the figure of the region E. In this case, however, a true darkest point F is not located at the centroid of the region E and it is slightly deviated toward a right-down position. On the other hand, in a case where there is substantially no variation in brightness over the entire image frame area as shown in FIG. 32b, the centroid of the region E coincides with the darkest point F. Thus, there is a need to shift the position of the darkest point if the brightness of the image frame area is uneven.

The process of shifting the darkest point will be schematically described with reference to FIG. 34.

A point G is set on the circumference of a circle having a center coinciding with the center of the image frame, and the difference between brightnesses in a diagonal direction is measured. A direction in which a brightest point in the image frame is located is ascertained from the brightness differences measured in this manner, and the corresponding brightness difference is also obtained.

Figure 34:
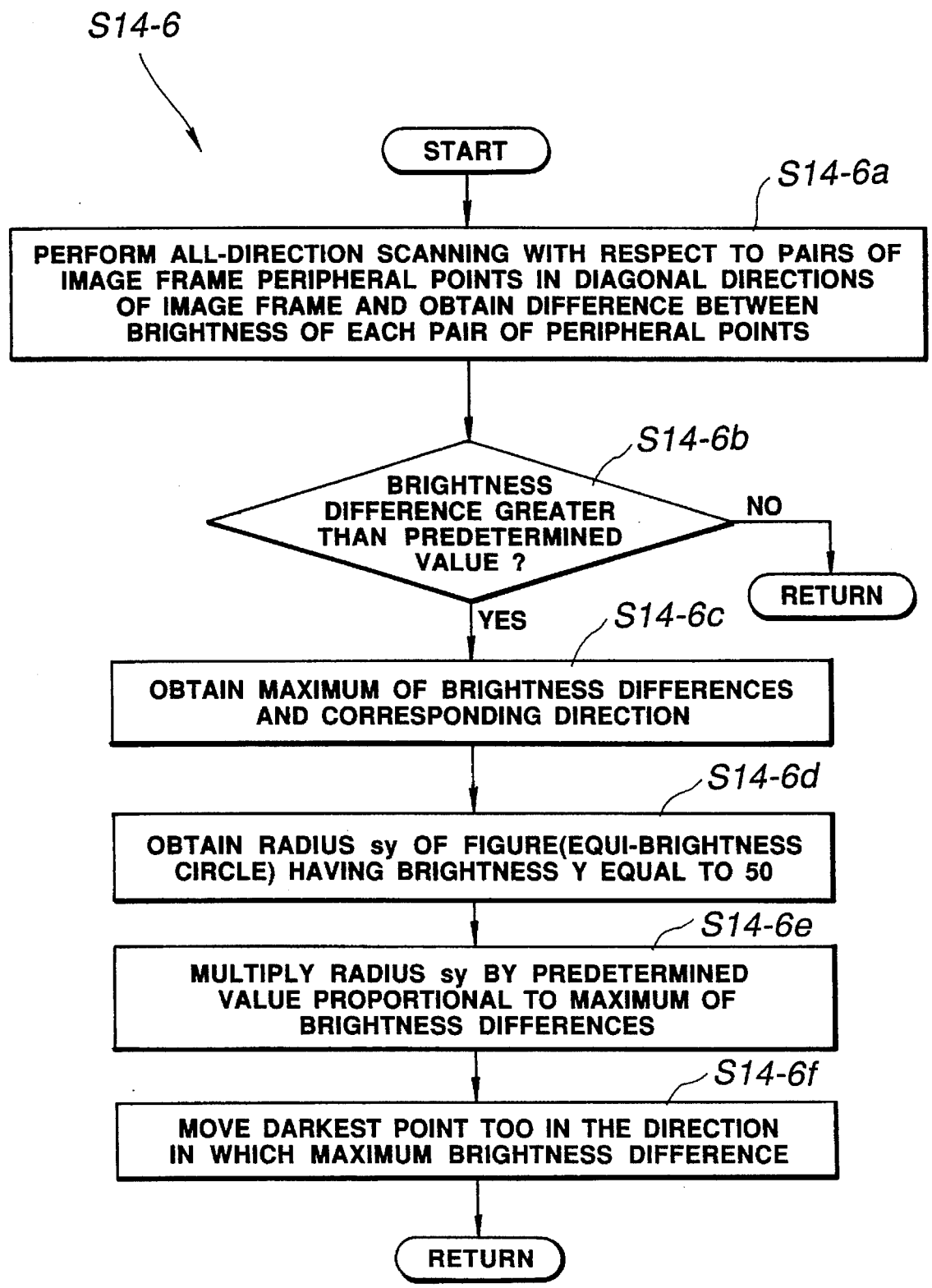

FIG. 34 shows the steps of this process.

First, in step S14-6a, a circle is set which has a center coinciding with the center of the image frame and which has a possible maximum size in the image frame. Pairs of points on the circle each opposing in diametral directions, i.e., pairs of points of intersection between the circle and diagonal lines extending through the center of the circle are scanned in all directions. Next, the difference between the brightnesses of the pair of points at the opposite ends of each diametral line is obtained.

In step S14-6b, determination is made as to whether the brightness difference is greater than a predetermined value. If NO, that is, the variation in brightness over the image frame area is small, the process is terminated.

If the brightness difference is greater than the predetermined value, the maximum brightness difference and the corresponding direction are obtained in step S14-6c.

In step S14-6d, a radius sy of a figure (equi-brightness circle) having a brightness Y of 50 is obtained in the same manner as an equi-brightness circle.

That is, the center of the figure E shown in FIG. 32a is obtained. If the brightness difference is large, the darkest point F is moved to the extent corresponding to the radius of the equi-brightness circle. If the brightness difference is not large, point F need not be shifted much.

Then, in step S14-6e, the value sy is multiplied by a predetermined value proportional to the maximum of the brightness difference. In step S14-6f, the darkest point is moved by the value obtained by multiplying the value sy by the predetermined value. It is moved in the direction of the greatest brightness difference.

Next, the process of calculating three-dimensional coordinates of the center of an equi-brightness circle at a distance from shifts of a darkest point and the center of the equi-brightness circle and the distance of the equi-brightness circle as in step S14-7 shown in FIG. 23 will be described below with reference to FIGS. 35 and 36.

Figure 35:
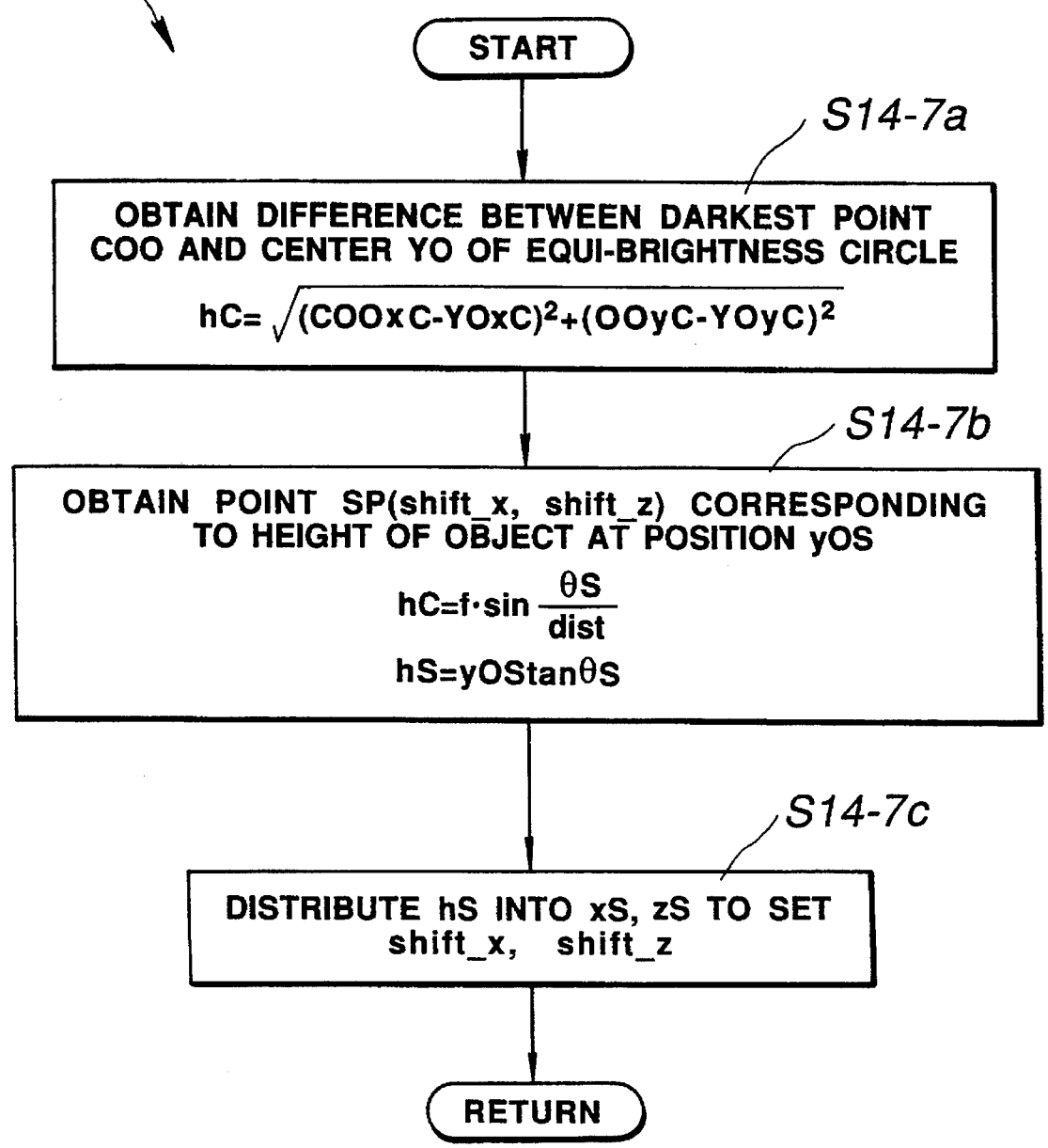

In the first step S14-7a shown in FIG. 35, the image height of a darkest point COO and a center YO of an equi-brightness circle in the image plane is obtained.

$$hC \cdot hC = (C00xC - Y0xC) \cdot (C00xC - Y0xC) + (C00yC - Y0yC) \cdot (C00yC - Y0yC)$$

In step S14-7b, a point at a height which determines an image height hS of an object located at the distance yOS from the fore end of the scope is ascertained. This point is set as SP.

$$hC = f \cdot \sin \theta S / dist$$

Figure 36A:
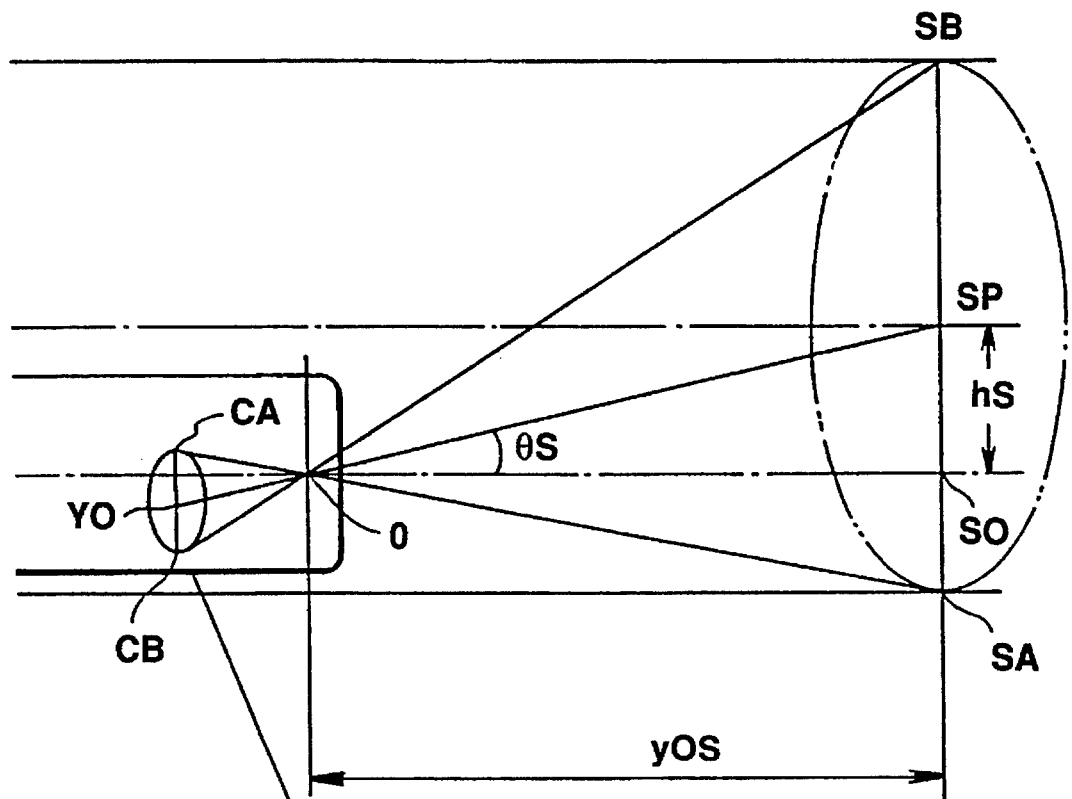
FIG. 36(a)–36(b) are diagrams of a state in which the measuring coordinate system is translated so as to coincide with the pipe coordinate system.
Figure 36B:
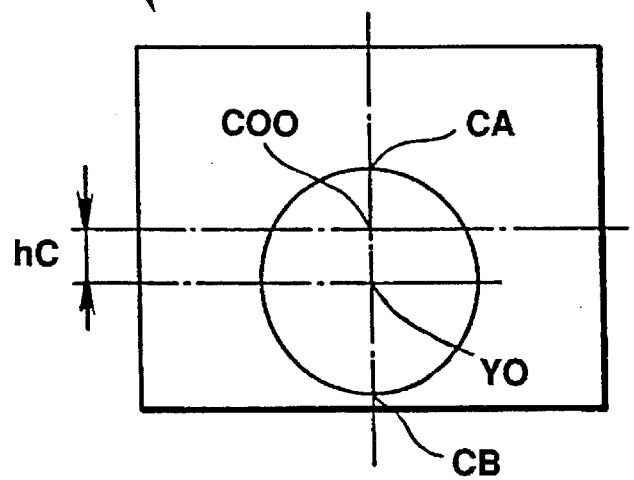

Assuming that a point at which a plane perpendicular to the y-axis and the center axis of the optical system intersect each other is SO as shown in FIGS. 36(a)–36(b), the distance hS between SP and SO coincides with the extent of translation between the center axis of the pipe and the scope. At this time, the measuring axis alignment is not completed and, therefore, SO coincides with the center of the image and with the center of the equi-brightness circle. SP is the center of the equi-brightness line as viewed in the image, but it is a mere point in the space in the measuring coordinate system.

When the measuring coordinate system is made to coincide with the pipe coordinate system, SP becomes a center point of the equi-brightness line in the measuring coordinate system. Even when the measuring coordinate system does not coincide with the pipe coordinate system, the value of hS is the same. Therefore the shift of the scope can be calculated by the following equation:

$$hS = yOS \tan \theta S$$

The calculated hS is a spatial length, and it is necessary to distribute hS into values on the x- and z-axes of the measuring coordinate system. The length hS is distributed in the same manner as the method shown in FIG. 17. In step S14-7c shown in FIG. 35, it is distributed into shift_x and shift_z.

The operation of translating the measuring coordinate system by values obtained by multiplying x- and z-coordinates of the center by −1 as in step S14-8 shown in FIG. 23 is performed as described below with reference to FIG. 37.

Figure 37:
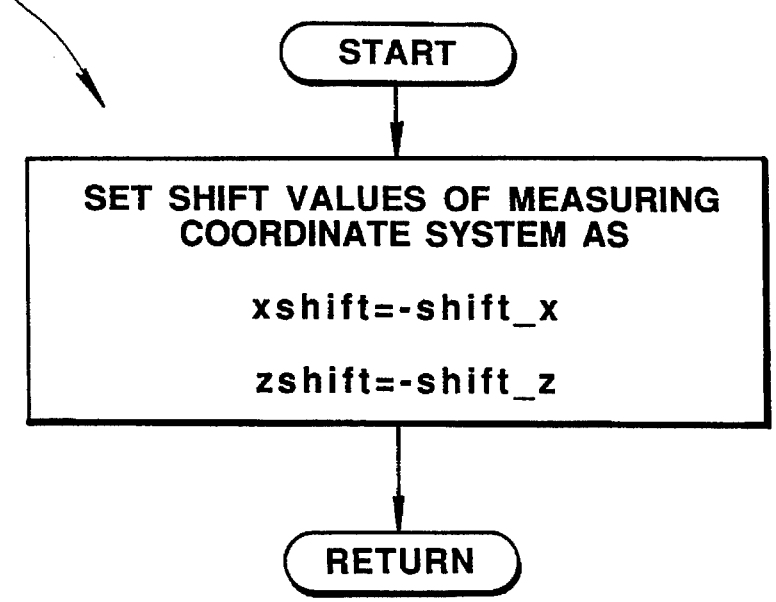

As shown in FIG. 37, values of the shift of the measuring coordinate system are assumed as xshift, zshift and are set to values obtained by multiplying calculated shift values shift x and shift z by −1.

That is, the measuring coordinate system is moved a distance represented by these values.

Next, the measurement of step S15 shown in FIG. 21 will be described below with reference to FIG. 38.

Figure 38:
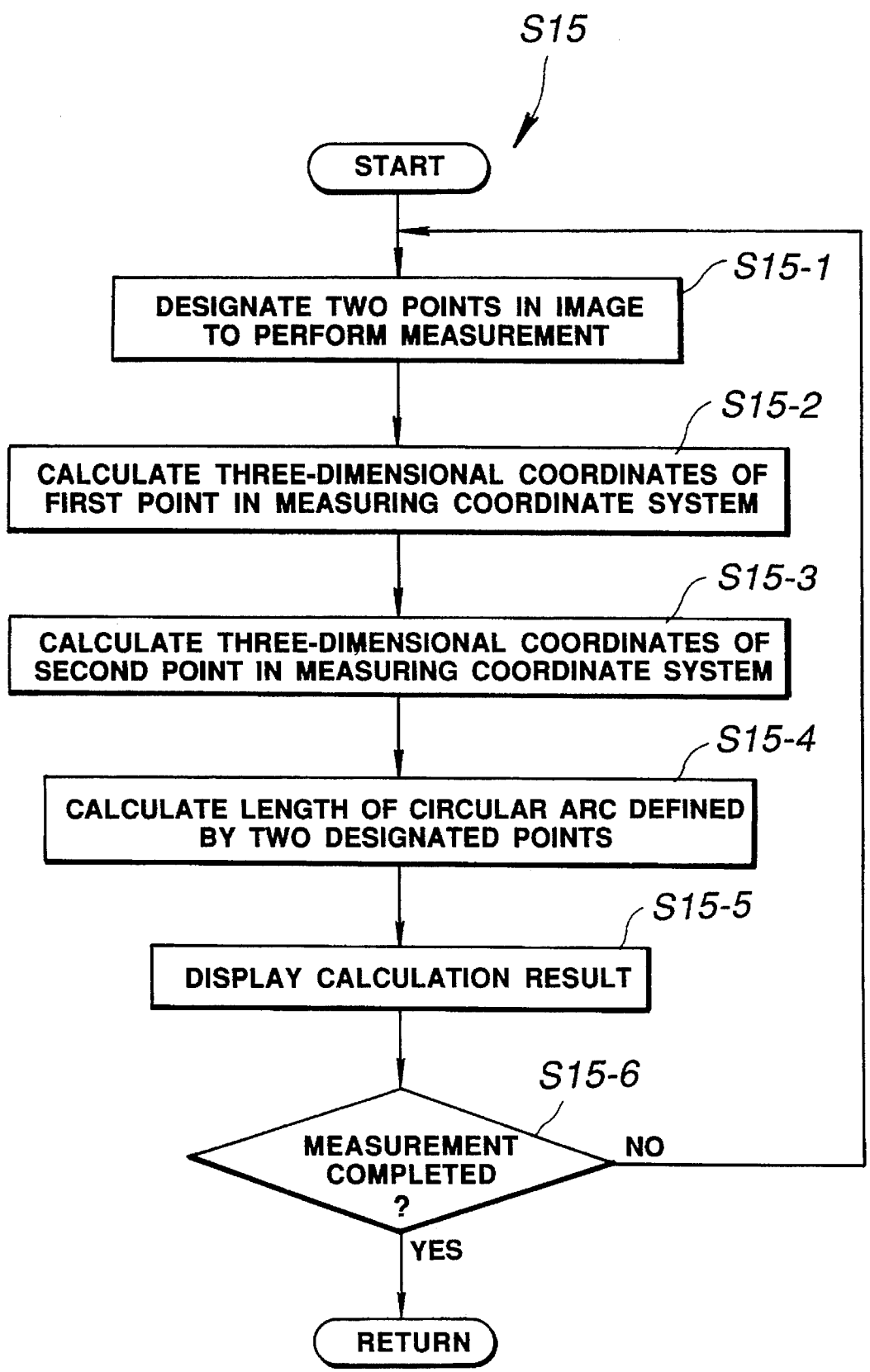

In step S15-1 shown in FIG. 38, two point in the image frame are designated to measure a length. After the point designation, in steps S15-2 and S15-3, three-dimensional coordinates of each point in the measuring coordinate system are calculated. In step S15-4, the distance between the two points along the inner surface of the pipe, i.e., the length of a circular arc defined by the two points. Thereafter, in step S15-5, the result of the calculation is displayed. According to the determination of step S15-6 as to whether the measurement is to be terminated, the same measurement is continued with respect to other measurement points or the measurement is terminated.

A method of calculating three-dimensional coordinates in the measuring coordinate system of points designated in the image frame in a step S15-2 or S15-3 will be described below with reference to FIG. 39.

First, in step S15-2a, coordinates designated in the T coordinate system are converted into coordinates in the C coordinate system. This conversion is effected by ordinary conversion formulae for expansion/contraction and translation.

Then, in step S15-2b, three-dimensional coordinates in the measuring coordinate system are calculated from the C coordinate system. The following are relational expressions for this calculation.

Relational equations of image height hC and incident angle θS in the C coordinate system:

$$hC \cdot hC = (hxC \cdot hxC + hyC \cdot hyC)$$

$$hC = f \cdot \sin \theta S / dist$$

Relational equations for distributing object height hS in the S coordinate system into values on x- and y-axes of the S coordinate system:

hxC/hC=cos α hxS=hS cos α hS=hyS tan θS hyS=hS sin α

Relational equation of calculation from the S coordinate system to the measuring coordinate system, expressing rotation about x- and z-axes and translation of a three-dimensional space:

$$\begin{pmatrix} xM \\ yM \\ zm \end{pmatrix} = \begin{pmatrix} \cos(-\theta z) & \sin(-\theta z) & 0 \\ -\sin(-\theta z) & \cos(-\theta z) & 0 \\ 0 & 0 & 1 \end{pmatrix} \times$$

$$\begin{pmatrix} 1 & 0 & 0 \\ 0 & -\cos(-\theta x) & \sin(-\theta x) \\ 0 & -\sin(-\theta x) & \cos(-\theta x) \end{pmatrix} \begin{pmatrix} hxS \\ hyS \\ hzS \end{pmatrix} + \begin{pmatrix} -x \text{ shift} \\ 0 \\ -z \text{ shift} \end{pmatrix}$$

Relational equation of the existence of a point on the pipe surface in the measuring coordinate system:

$$xM \cdot xM + zM \cdot zM = (D/2) \cdot (D/2)$$

There are six variables xM, yS, zS, xM, yM, and zM and six independent equations. Therefore, these equations can be solved.

In step S15-2c, xM, yM, and zM, i.e., solutions of these equations, are obtained as target three-dimensional coordinates.

After the three-dimensional coordinates of two measured points have been determined in steps S15-2 and S15-3 shown in FIG. 38, the length of the circular arc defined by the two designated points is calculated.

Figure 41:
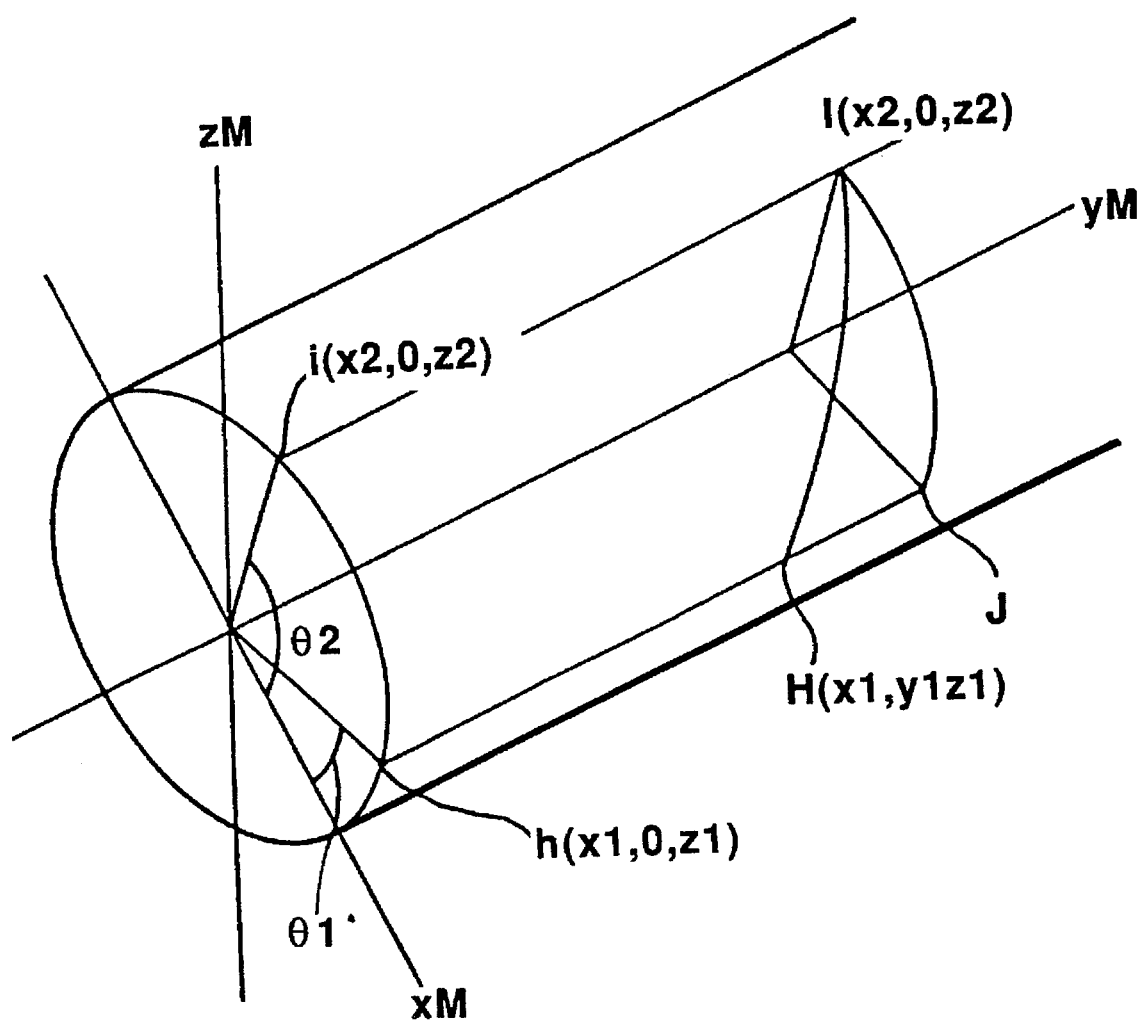

FIGS. 40 and 41 shows a method for this calculation Referring to FIG. 41, a first point H and a second point I are projected to a plane of yM=0 to define projected points h and i thereon.

Let angles between the projected points and the x-axis be θ1 and θ2. Then, as in steps S15-4a and 15-4b shown in FIG. 40, or in the form of squares, (cos θ1)·(cos θ1)=x1.x1/(x1.x1+z1.z1), (cos θ2)·(cos θ2)=x2.x2/(x2.x2+z2.z2)

The length of the circular hi arc defined by the projection is hi=D×(θ2−θ1)/2p as shown in step S15-4c. This is equal to the length of a line IJ. Therefore, the length L of a line HI to be obtained is expressed by L.L=(hi·hi+(y2−y1)·(y2−y1))

as shown in step S15-4d.

In step S15-5 shown in FIG. 38, the result of calculation is displayed.

If the measurement is to be repeated after the determination in step S15-6, the process returns to the first step. If the measurement is to be terminated, an end operation is performed.

In step S16 shown in FIG. 21, end processing is performed.

After the completion of the measurement, the diameter and other variables of the set pipe are filed and recorded on the hard disk, thereby completing the process of this program.

By the above-described arrangement, matching of the measuring coordinate system with a pipe can be automatically effected.

In this embodiment, a minimum radius value extracted when the radius of an equi-brightness line is extracted is used. Alternatively, a radius value in a range such as to be smaller than the average value by a standard difference σ may be used. It is thereby possible to accurately extract the radius even if an extracted image is uneven so that there is a variation in the extracted radius.

A second embodiment of the present invention will now be described below.

While a vanishing point and an equi-brightness line are automatically extracted by image processing in the first embodiment, a method of manually selecting points by observing an image without using image processing is adopted in this embodiment.

FIGS. 42a to 42d show operating interface windows of this method.

Figure 42A:
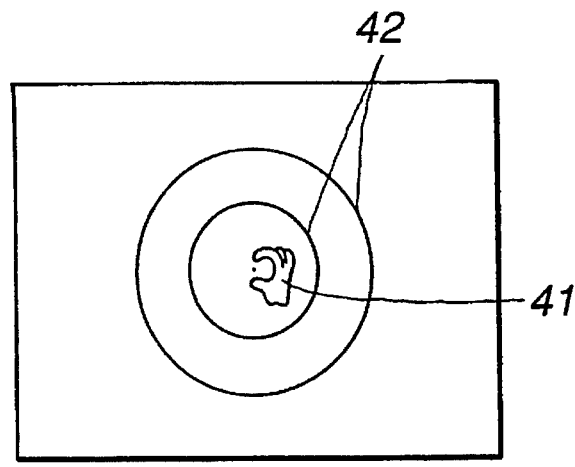
FIGS. 42a to 42d and FIGS. 43a and 43b relate to a second embodiment of the present invention.
Figure 42B:
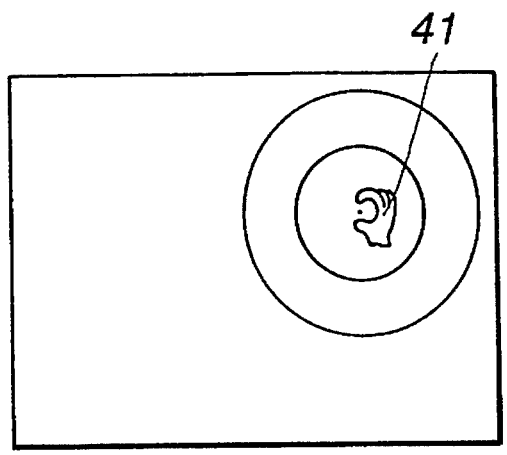

FIG. 42a shows an interface window when an operation of extracting a darkest portion in an image is performed.

Two concentric circles with a center are superimposed in the image as guide lines 42. A cursor 41 having the shape of a hand grasping the center is displayed. The cursor 41 is moved by the operation of a cursor moving key on the keyboard. The guide lines 42 are also moved by following the movement of the cursor 41 (see FIG. 42b).

Figure 42C:
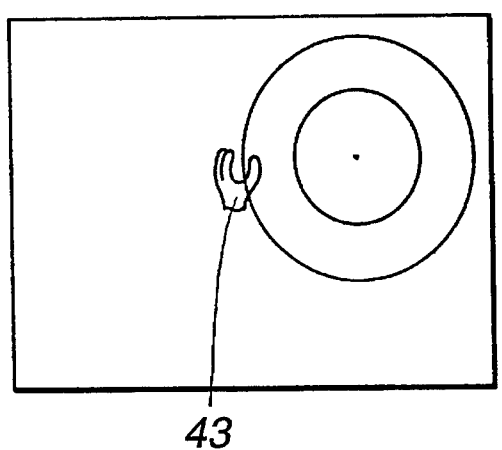

When the center of the guide lines is adjusted to a darkest point in the image, an entry key is pressed. Then a cursor 43 shown in FIG. 42c is displayed.

Figure 42D:
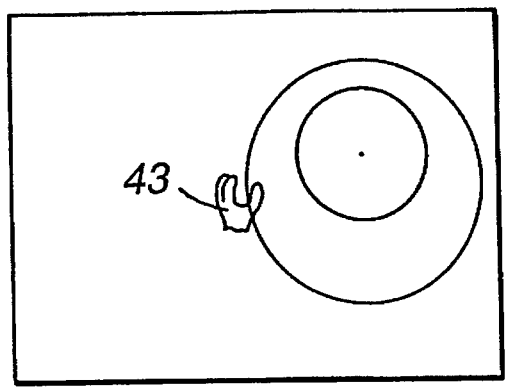

When the guide line 43 is adjusted to an equi-brightness line as shown in FIG. 42d, the entry key is pressed.

In this manner, the coordinates of the measuring system can be made to coincide with these of the P coordinate system, as in the case of the first embodiment.

Figure 43A:
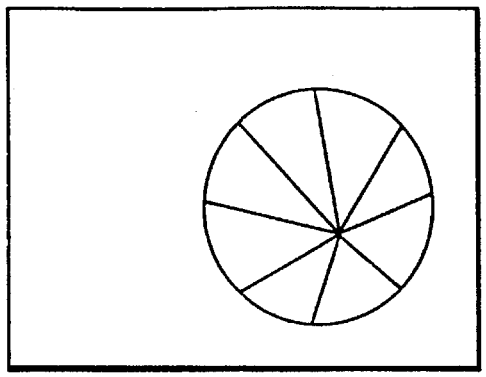
Figure 43B:
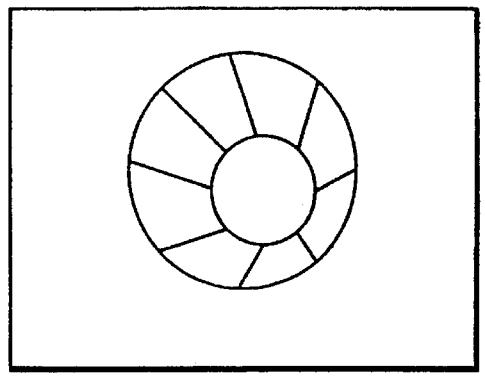

FIGS. 43a and 43b show other examples of guide lines. FIG. 43a shows a guide point for setting a vanishing point, a guide circle for setting a cross-sectional configuration, and lines extending radially from the point to the circle line. FIG. 43b shows an inner circle in addition to a guide point and lines corresponding to those shown in FIG. 43a. Only the guide point is displayed inside the inner circle.

Figure 44:
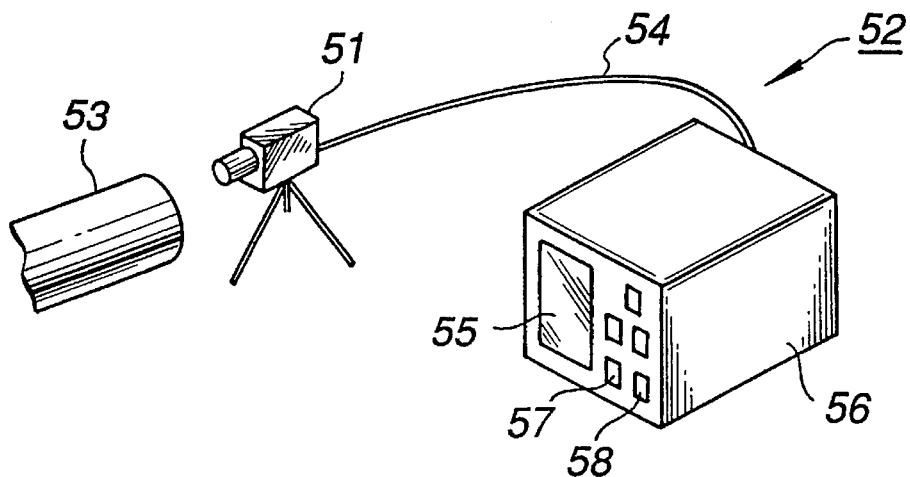
FIGS. 44 and 45 relate to a third embodiment of the present invention.

A third embodiment of the present invention will be described below with reference to FIG. 44. The third embodiment comprises a three-dimensional measuring apparatus 52 using an ordinary TV camera 51 instead of an endoscope. This apparatus is used to examine a surface of a pipe line. As shown in FIG. 44, the three-dimensional measuring apparatus 52 is constituted of the TV camera 51 capable of imaging a pipe 53, and a measuring unit 56 connected to the TV camera 51 by a cable 54 and having a signal processing means and a monitor 55 integrally combined. The signal processing means serves to process a signal from an imaging means incorporated in the TV camera 51. The monitor 55, and entry key 57 and a cursor key 58 are provided in a panel of the measuring unit 56.

Figure 45:
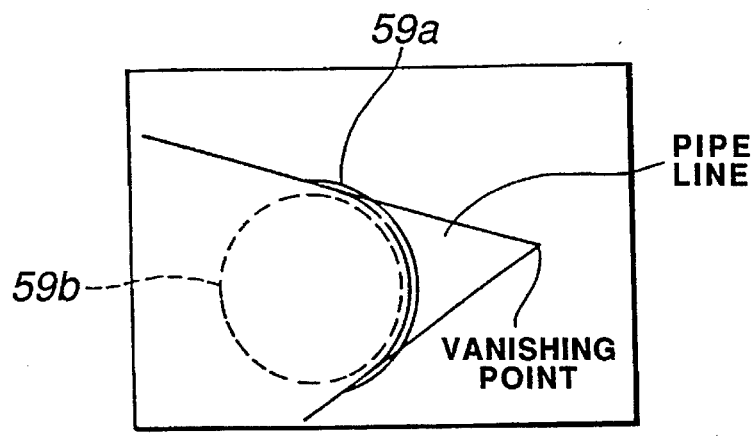

FIG. 45 shows an example of an image formed when the pipe line is observed. A vanishing point of the pipe line is seen in the image. A flange 59a for connection of the pipe 53 is seen as a portion of the pipe 53.

A vanishing point is designated in the image frame as in the case of the second embodiment. Thereafter, the guide line 59b indicated by the broken line is adjusted to the line of the flange 59a of the pipe 53. From data obtained by these two operations, the measuring coordinate system can be set on the pipe line by the method described above with respect to the first embodiment.

It is possible to calculate three-dimensional coordinates of a point on the pipe line by calculating the observed point in the measuring coordinate system from the corresponding point in the image.

The measuring method is the same as that in the first embodiment.

In the above-described embodiments, a pipe uniform in cross section along a longitudinal direction is used. However, it is not necessary that an examined object has a circular cross section, and examined objects may have any sectional shape, e.g., an ellipse, a square, a rectangle or polygon.

It is not always necessary to use an equi-brightness line as a means for determining a cross section of a pipe. A line of a connection coinciding with a pipe cross section may be used, and a line coinciding with a cross section and drawn in the inner surface of the pipe may be used.

From a two-dimensional observed image in the above-described embodiments, three-dimensional coordinates of an elongated member such as a pipe cannot be obtained unless a remotest point on the elongated member exists as a darkest point in the image frame. Also, it is necessary that the elongated member is straight.

For this reason, a kind of pipe, such as a U-tube for a heat exchanger, formed of a combination of a straight portion and a curved portion cannot be measured by the above-described method and apparatus. A fourth embodiment of the present invention capable of obtaining three-dimensional coordinates even if an elongated object is not straight or no suitable darkest point exists in an observed image will now be described below.

The hardware construction of an endoscopic apparatus in accordance with the fourth embodiment is the same as that of the endoscopic apparatus shown in FIG. 1.

Figure 46:
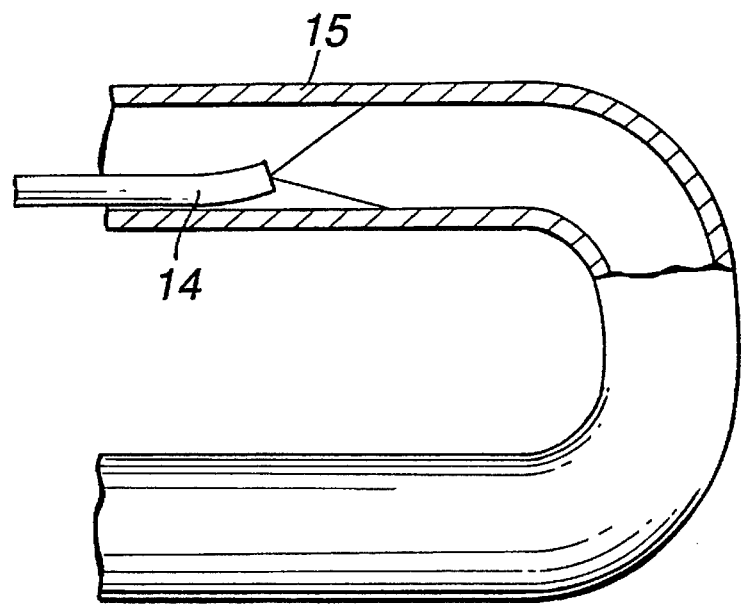
FIGS. 46 to 54 relate to a fourth embodiment of the present invention.

A method of calculating three-dimensional coordinates of an inner surface of an observed U-shaped pipe, e.g., a pipe of a heat exchanger will be described below. As shown in FIG. 46, a pipe 15 in a heat exchanger is U-shaped and formed of a combination of straight portions and a curved portion. A fore end portion 14 of an endoscope inserted portion 7 is inserted into the pipe 15 to observe an inner portion thereof.

Figure 47:
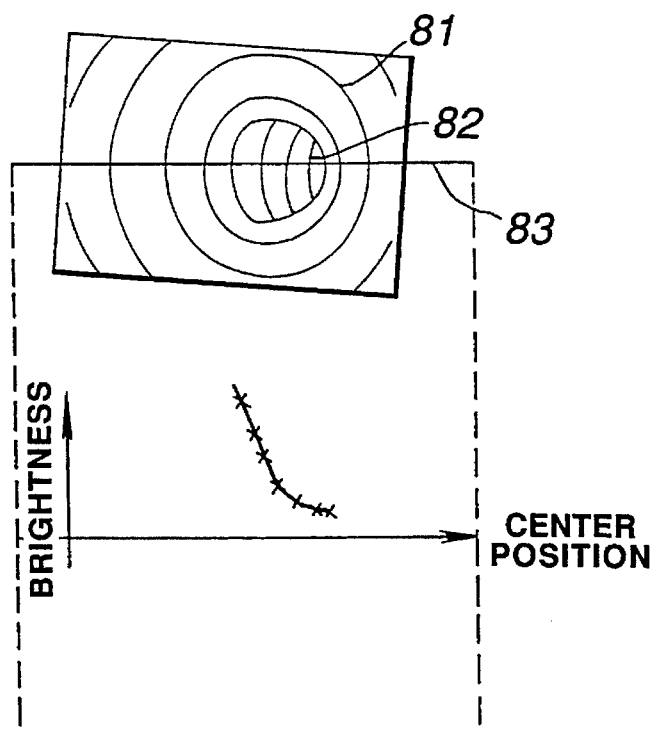

FIG. 47 shows an observed image thereby obtained. An equi-brightness line extracted from an area in the image frame corresponding to the straight portion of the pipe forms a circle, as in the case of an equi-brightness line 81 shown in FIG. 47. Equi-brightness lines on an image area corresponding to the curved portion of the pipe, each are exhibited as an array of circular arcs, each formed like an equi-brightness line 82. After such equi-brightness lines have been extracted, a straight line 83 connecting centers of equi-brightness lines 81 and 82 is drawn on the image.

As in the above-described embodiments, the center of the circle of the equi-brightness line 81 on the straight pipe portion is located on the straight line 83. On the other hand, equi-brightness lines on the curved portion of the pipe are formed as segments of circular lines. With respect to the center of these figures, set as centroids thereof, a graph such as that shown in-a lower section of FIG. 47 is examined.

The graph shown in FIG. 47 is formed by indicating the brightness of the figures of equi-brightness lines on the ordinate and by indicating the center portions of the figures of the equi-brightness lines along the straight line 83 on the abscissa. From this graph, it can be understood that the relationship between the center positions of the equi-brightness lines and the brightness is substantially linear with respect to the straight pipe portion but deviates largely from a linear relationship with respect to the curved pipe portion.

In this embodiment, two equi-brightness line circles are extracted and the distance of the portion corresponding to each equi-brightness circle from the coordinate center O of the scope optical system is obtained to determine the three-dimensional position of the center of each equi-brightness circle. To do so, two equi-brightness circles are obtained from the straight pipe portion of a linear relationship between the equi-brightness line center positions and the brightness. Two brightness values for obtaining two equi-brightness circles are set to extract equi-brightness circles.

Figure 48:
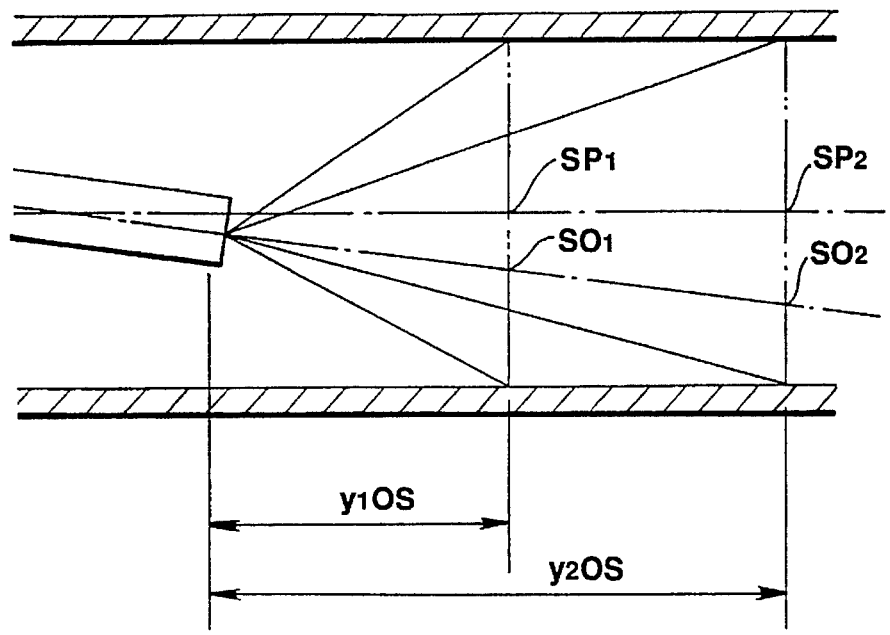

Equi-brightness circles corresponding to these two brightness values are as indicated by the double-dot dash lines in FIG. 48. In FIG. 48, points at which the equi-brightness lines intersect the coordinate axis of the scope are indicated by S01 and S02, and center points of the equi-brightness circles are indicated by SP1 and SP2. The distances of the equi-brightness lines from the coordinate center O of the scope optical system are y1OS and y2OS. The distances y1OS and y2OS between the center points SP1 and SP2 of the two equi-brightness lines and the scope can be obtained in the same manner as in the case shown in FIG. 20.

Also, as shown in FIG. 20, an incident ray passing the through the point SP can be determined from a shift on the image plane corresponding to hC, the three-dimensional position of the point SP at the distance yOS can be calculated. Similarly, three-dimensional coordinates of the center points SP1 and SP2 of the equi-brightness circles viewed from the scope can be calculated from the distances y1OS and y2OS and the diameters of the equi-brightness circles.

After three-dimensional coordinates of the centers of the equi-brightness circles at different distances with respect to the scope have been calculated in this manner, an equation of a straight line extending through these two points can be obtained. That is, this straight line coincides with the y-axis of the above-described measuring coordinate system (M coordinate system).

Figure 39:
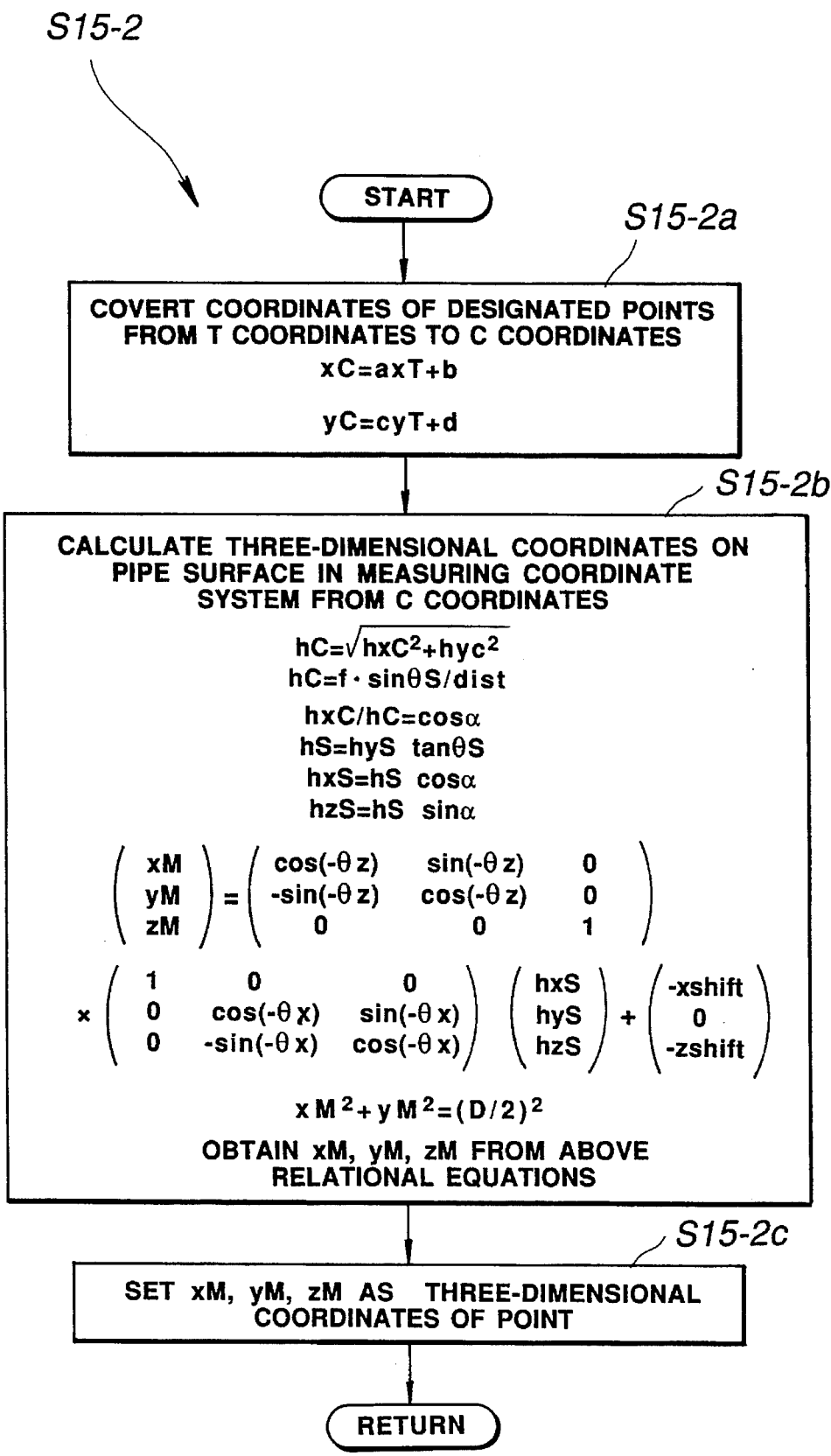
Figure 49:
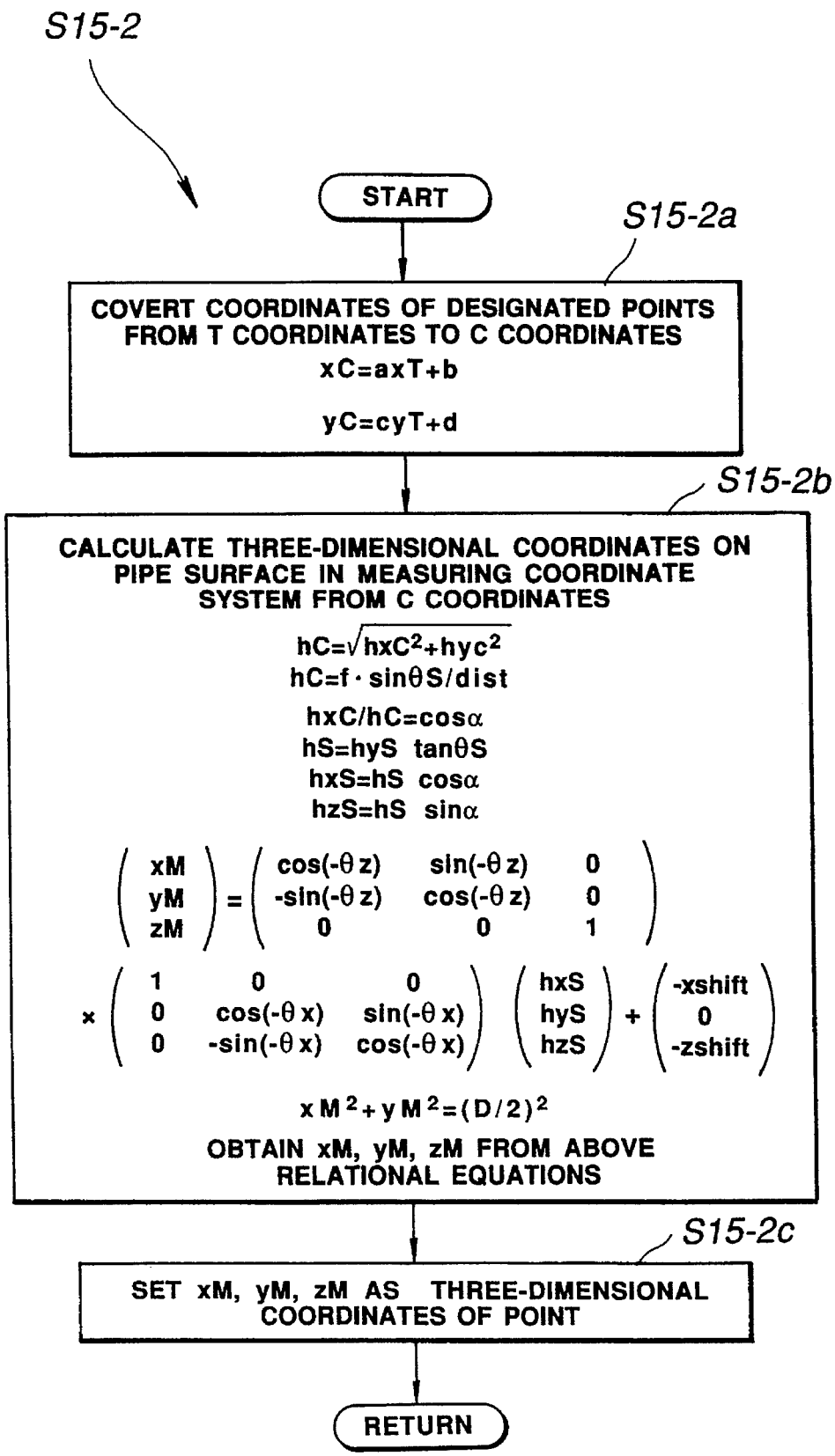

Further, since the diameter of the pipe is known, three-dimensional coordinates of an inner surface of the pipe about this straight line with respect to the scope can be obtained, as shown in FIG. 39 or 49.

That is, three-dimensional coordinates xM, yM, and zM are obtained in steps S15-2a to S15-2c, in the same manner s the first embodiment. In FIG. 39, the T coordinate system is a coordinate system on the monitor screen, and the C coordinate system is a coordinate system on the CCD surface.

First, in step S15-2a, coordinates designated in the T coordinate system are converted into coordinates in the C coordinate system. This conversion is effected by ordinary conversion formulae for expansion/contraction and translation.

Then, in step S15-2b, three-dimensional coordinates in the measuring coordinate system are calculated from the C coordinate system.

That is, xM, yM, and zM are obtained from the relational determinant of (xM, yM, zM) and (xS, yS, zS) and $$xM \cdot xM + zM \cdot zM = (D/2) \cdot (D/2).$$

In step S15-2c, xM, yM, and zM, i.e., solutions of these equations, are set as target three-dimensional coordinates. In this manner, three-dimensional coordinates of points on the pipe surface viewed from the scope can be calculated.

According to this embodiment, as described above, three-dimensional coordinates on the pipe surface can be calculated even if no suitable darkest point exists in the observed image or the pipe is not straight. It is therefore possible to obtain three-dimensional position information of the pipe corresponding to any points on an image by using known information. It is also possible to easily determine a three-dimensional length, a three-dimensional area and the like by using such three-dimensional position information. Measurement operations are thereby facilitated. Also, the present invention can be applied to existing endoscopes having no auxiliary measuring mechanism.

Further, in this embodiment, the height or depth of irregularities in an inner surface of a pipe can be measured. A method for this measurement will be schematically described with reference to FIG. 50 and other figures.

Figure 50:
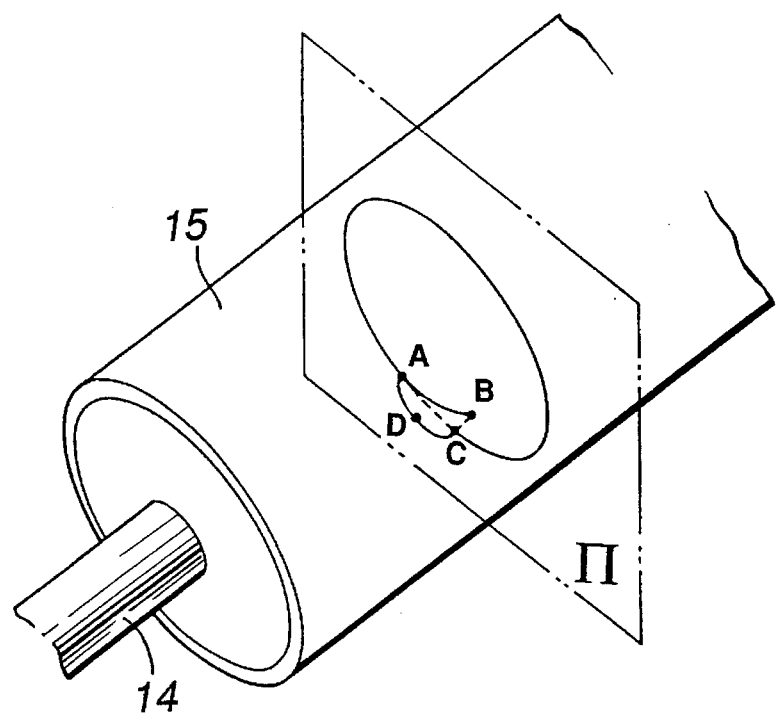
Figure 51:
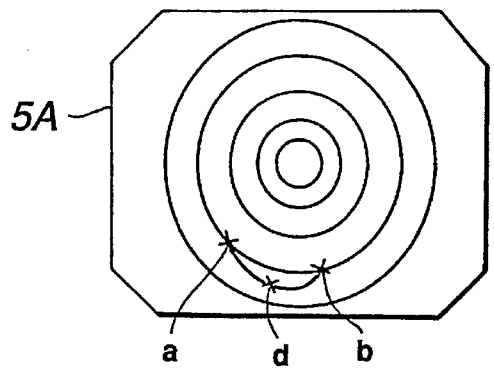

Let first and second points corresponding to the width of a groove in the pipe 15 in a three-dimensional space to A and B, as shown in FIG. 50. Let points on the monitor screen 5A corresponding to the first and second points be a and B, as shown in FIG. 51. A flat plane Π containing the first point A and perpendicular to the center axis of the pipe 15 is set. A point C is set as as a point on the flat plane Π to which the second point B is projected along the center axis of the pipe 15.

Next, a point d corresponding to the depth or height of irregularities, i.e., the depth of the groove in this case, is designated in the image frame. The point d can be represented by a point D on the flat plane Π. If a straight line 1 extending through the point D and parallel to AC in the flat plane Π is set, the height of the groove is expressed by h.

Figure 54:
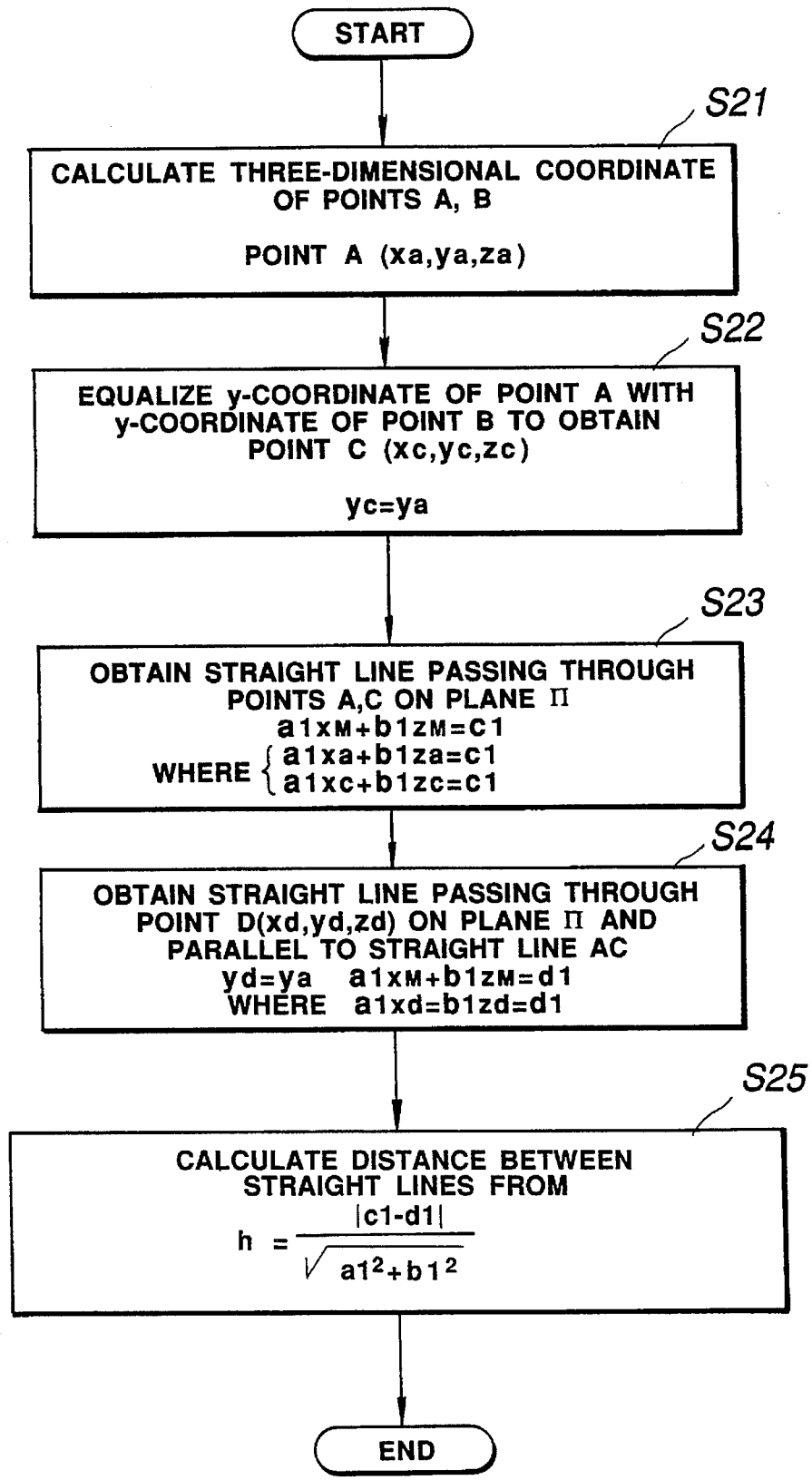

A method for obtaining this value h will be described with reference to the flowchart of FIG. 54. First, in step S21, three-dimensional coordinates of the points A and B are calculated. The point (xa, ya, za) and the point B (xb, yb, zb) can be determined by the above-described method. In step S22, three-dimensional coordinates (xc, yc, zc) are obtained. The three-dimensional coordinates of the point A can be obtained by equalizing the y-coordinate of the point B to the y-coordinate of the point A (ya=yc), i.e., by moving the point B parallel to the center axis of the pipe.

Next, in step S23, a straight line extending through the points A and C in the flat plane F]is determined. If A (xa, ya, za) and C (xc, yx, and zc), a straight line extending through the points A and C in the flat plane Π in FIG. 51 is expressed by $$a1xM+b1zM=c1$$

while a1 xa+b1 za=c1, and a1 xc+b1 zc=c1.

In step S24, a straight line extending through the point D in the flat plane P and parallel to the straight line AC is obtained. If D (xd, yd, zd), the straight line parallel to the straight line AC and extending through the point D is expressed by $$a1\ xM+b1\ zM=d1$$

while a1 xd+b1 zd=d1 from yd=ya.

Figure 53:
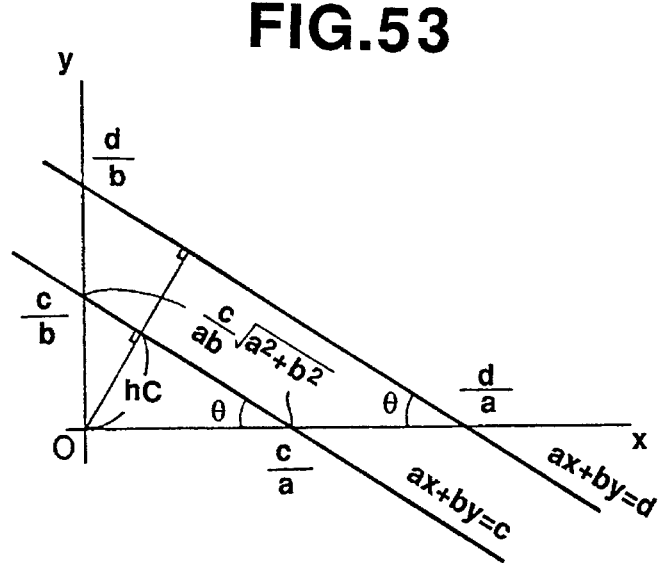

In step S25, the distance between the two straight lines is obtained. As shown in FIG. 53, hC=c/b·cos θ, and cos θ=(c/a)/(c/ab) (a2+b2)½.

From these equations, $$hC=c/(a2+b2)^{1/2}.$$

Therefore, the distance between the two straight lines can be calculated by $$h=|c-d|/(a2+b2)^{1/2}.$$

Figure 52:
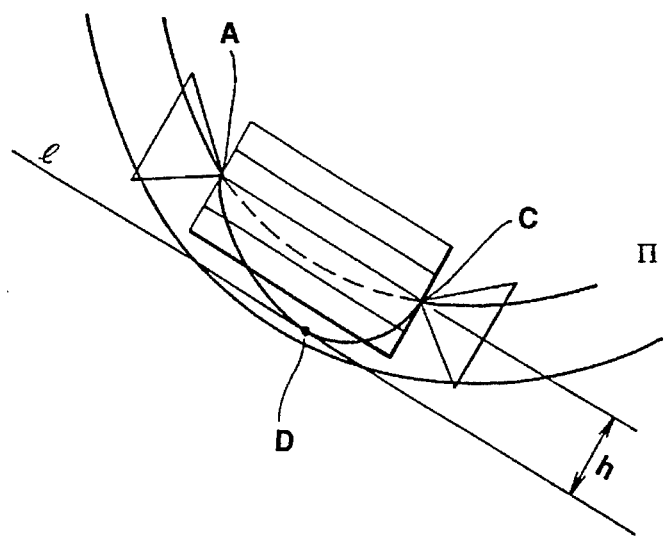

This distance h corresponds to h in FIG. 52. Thus, it is possible to obtain the depth or height of irregularities in an inner surface of a pipe by the above-described process.

In this embodiment, two equi-brightness circles are used to obtain three-dimensional coordinates. However, three or more equi-brightness circles may be used to improve the measuring accuracy. In such a case, the coordinate position is set to an average position of straight lines defined by pairs of points.

In the fourth embodiments, equi-brightness circles are extracted through the brightness over the area of the image frame, but this method is not exclusive. Equi-brightness circles may be extracted by combining chromatic information. For example, if pipes formed of different materials are connected, a method using such information enables a cross-sectional configuration of the pipe to be extracted more accurately in comparison with the method using brightness changes alone, because the color of the pipe inner surface varies greatly.

According to the fourth embodiment, as described above, three-dimensional coordinates can be obtained from a two-dimensional image by extracting variables other then known constants from the observed image without using any auxiliary measuring instrument, even when the elongated member to be examined is not straight or no suitable darkest point exists in the observed image. A three-dimensional length and other quantities can be thereby measured.

What is claimed is:

1. A method for measuring a three-dimensional position of an inner surface of a hollow elongated member in an endoscopic observation system comprising:

an information calculation step for calculating information for setting a measuring coordinate system relating a position on an image of the elongated member having a uniform cross section and a three-dimensional position on the elongated member by extracting one cross-sectional configuration of the elongated member from a display screen on which the image of the elongated member is displayed, and by extracting a vanishing point corresponding to a darkest point in the image; and a coordinate system setting step for setting the measuring coordinate system by using the information calculated in said information calculation step and known information on the elongated member and imaging means used to image the elongated member to enable calculation of the three-dimensional position on the elongated member corresponding to an arbitrary position in the image of the elongated member displayed on the display screen.

2. A method for measuring a three-dimensional position according to claim 1, wherein, in said information calculation step, information for setting the measuring coordinate system is calculated by the extraction of said one cross-sectional configuration and the vanishing point.

3. A method for measuring a three-dimensional position according to claim 2, wherein said information calculation step includes a center calculation step of obtaining position information on a reference position at which a center of the image of the elongated member displayed on the display screen is displayed when the elongated member is imaged in a state such that an optical axis of said imaging means coincides with a center axis of the elongated member.

4. A method for measuring a three-dimensional position according to claim 3, wherein said reference position is set so as to coincide with a center of the display screen.

5. A method for measuring a three-dimensional position according to claim 3, wherein said information calculation step includes an inclination calculation step of calculating an inclination of the optical axis of the imaging means forming the image relative to the center axis of the elongated member from position information on the reference position and position information on the vanishing point.

6. A method for measuring a three-dimensional position according to claim 1, wherein, in said information calculation step, a center and a diameter of said one cross-sectional configuration are obtained.

7. A method for measuring a three-dimensional position according to claim 6, wherein said coordinate system setting step includes a distance calculation step of calculating a distance from the position of the diameter to the imaging means forming the image.

8. A method for measuring a three-dimensional position according to claim 7, wherein three-dimensional coordinates at a center of said one cross-sectional configuration is calculated from shifts of the cross-sectional configuration and the vanishing point and the value of said distance.

9. A method for measuring a three-dimensional position according to claim 1, wherein the extraction of said one cross-sectional configuration is executed by extracting a portion uniform in brightness level in the image.

10. A method for measuring a three-dimensional position according to claim 1, wherein said information calculation step includes an inclination calculation step of calculating an inclination of an optical axis of the imaging means forming the image relative to a center axis of the elongated member.

11. A method for measuring a three-dimensional position according to claim 1, wherein said information calculation step includes a shift calculation step of calculating a shift of an optical axis of the imaging means forming the image from a center axis of the elongated member.

12. A three-dimensional position measuring apparatus for measuring an inner surface of a hollow elongated member in an endoscopic observation system comprising:

imaging means for imaging said elongated member having a uniform cross section;

signal processing means for performing signal processing with respect to said imaging means;

display means for displaying a video signal outputted from said signal processing means;

matching/extraction means for matching of one figure similar to a cross-sectional configuration of the elongated member on a display screen of said display means on which an image of the elongated member is displayed through the video signal, and for matching of another figure similar to the cross-sectional configuration of the elongated member but different from said one figure, and for extracting a vanishing point of the image on the display screen;

center point extraction means for extracting centers of the figures used by said matching/extraction means; and coordinate system setting means for setting a measuring coordinate system by using information extracted by said center point extraction means and known information on said imaging means and the elongated member, the measuring coordinate system enabling calculation of a three-dimensional position on a surface of the elongated member with respect to an arbitrary position on the image of the elongated member displayed on the display screen.

13. A three-dimensional position measuring apparatus according to claim 12, wherein said matching/extraction means comprises figure matching means for matching of two figures similar to a cross-sectional configuration of the elongated member.

14. A three-dimensional position measuring apparatus according to claim 13, wherein said center point extraction means obtains centers of the two figures.

15. A three-dimensional position measuring apparatus according to claim 14, wherein said coordinate system setting means obtains an equation of a straight line extending through the centers of the two figures, and sets the measuring coordinate system by using the equation of the straight line.

16. A three-dimensional position measuring apparatus according to claim 12, wherein said matching/extraction means comprises figure matching means for matching of one figure similar to a cross-sectional configuration of the elongated member.

17. A three-dimensional position measuring apparatus according to claim 16, wherein said center point extraction means obtains a center of one of the two figures.

18. A three-dimensional position measuring apparatus according to claim 17, wherein said coordinate system setting means sets the measuring coordinate system by using information on the position of the center of one of the two figures and information on the position of the vanishing point.

19. A method for measuring a three-dimensional position of an inner surface of a hollow elongated member using an endoscopic observation system comprising:

an image information calculation step for calculating, from a display screen on which an image of an elongated member having a uniform cross section is displayed, a three-dimensional position on the elongated member corresponding to an arbitrary position in the image; and a measuring coordinate system setting step for setting a measuring coordinate system by using the image information, size information on the size of the elongated member and imaging information on imaging of imaging means forming the image, the measuring coordinate system enabling calculation of the three-dimensional position on the elongated member corresponding to the arbitrary position in the image of the elongated member displayed on the display screen.

20. A method for measuring a three-dimensional position according to claim 19, wherein, in said image information calculation step, image information regarding two cross-sectional shape portions of the elongated member on the display screen is extracted.

21. A method for measuring a three-dimensional position according to claim 19, wherein the size information comprises length information of a cross-section of the elongated member, and the imaging information comprises a focal length of said imaging means.

22. A method for measuring a three-dimensional position according to claim 19, wherein, in said image information calculation step, image information on one cross-sectional shape portion of the elongated member on the display screen, and information on the position of a vanishing point of the elongated member on the display screen are extracted.

23. A three-dimensional position measuring apparatus for measuring an inner surface of a hollow elongated member in an endoscopic observation system comprising:

imaging means for imaging said elongated member having a uniform cross section;

signal processing means for performing signal processing with respect to said imaging means;

display means for displaying a video signal outputted from said signal processing means; and coordinate system calculation means for extracting, from a display screen on which an image of the elongated member is displayed through the video signal, image information for calculating a three-dimensional position on the elongated member corresponding to an arbitrary position in the image to set a measuring coordinate system from the image information, size information on the size of the elongated member and imaging information on imaging of said imaging means forming the image, the measuring coordinate system enabling calculation of the three-dimensional position on a surface of the elongated member with respect to the arbitrary position on the image of the elongated member displayed on the display screen.

24. A three-dimensional position measuring apparatus according to claim 23, wherein said coordinate system calculation means extracts image information on two cross-sectional shape portions of the elongated member on the display screen.

25. A three-dimensional position measuring apparatus according to claim 23, wherein said coordinate system calculation means extracts image information on one cross-sectional shape portion supposed with respect to the elongated member on the display screen, and information on the position of a vanishing point of the elongated member on the display screen.

26. A method for measuring a three-dimensional position of an inner surface of a hollow elongated member in an endoscopic observation system comprising the steps of:

extracting, from a display screen on which an image of an elongated member having a uniform cross section is displayed, image information for calculating a three-dimensional position on the elongated member corresponding to an arbitrary position in the image; and setting a measuring coordinate system from the image information, size information on the size of the elongated member and imaging information on imaging of imaging means forming the image, the measuring coordinate system enabling calculation of the three-dimensional position on the elongated member with respect to the arbitrary position on the image of the elongated member displayed on the display screen.

27. A method for measuring a three-dimensional position of an inner surface of a hollow elongated member in an endoscopic observation system comprising:

an information calculation step for calculating information for setting a measuring coordinate system relating a position on an image of the elongated member having a uniform cross section and a three-dimensional position on the elongated member by extracting a cross-sectional configuration of the elongated member from a display screen on which the image of the elongated member is displayed, and by extracting a second cross-sectional configuration different from said first cross-sectional configuration from the display screen; and a coordinate system setting step for setting the measuring coordinate system by using the information calculated in said information calculation step and known information on the elongated member and imaging means used to image the elongated member to enable calculation of the three-dimensional position on the elongated member corresponding to an arbitrary position in the image of the elongated member displayed on the display screen.

28. A method for measuring a three-dimensional position according to claim 27, wherein center positions of the first and second cross-sectional configurations are calculated from the two first and second cross-sectional configurations.

29. A method for measuring a three-dimensional position according to claim 28, wherein, in said coordinate system setting step, the measuring coordinate system is set by using information on the center positions and the known information.

30. A method for measuring a three-dimensional position according to claim 27, wherein the extraction of one of the first and second cross-sectional configurations is executed by extracting a portion uniform in brightness level in the image.

31. A methods for measuring a three-dimensional position according to claim 27, wherein said information calculation step includes an inclination calculation step of calculating an inclination of an optical axis of the imaging means forming the image relative to a center axis of the elongated member.

32. A method for measuring a three-dimensional position according to claim 27, wherein said information calculation step includes a shift calculation step of calculating a shift of an optical axis of the imaging means forming the image from a center axis of the elongated member.

33. A method for measuring a three-dimensional position of an inner surface of a hollow elongated member in an endoscopic observation system comprising:

an information calculation step for calculating information for setting a measuring coordinate system relating a position on an image of the elongated member having a uniform cross section and a three-dimensional position on the elongated member by automatically extracting one cross-sectional configuration of the elongated member from a display screen on which the image of the elongated member is displayed, and by automatically extracting a vanishing point corresponding to a darkest point in the image; and a coordinate system setting up for setting the measuring coordinate system by using the information calculated in said information calculation step and known information on the elongated member and imaging means used to image the elongated member to enable calculation of the three-dimensional position on the elongated member corresponding to an arbitrary position in the image of the elongated member displayed on the display screen.

34. A method for measuring a three-dimensional position according to claim 33, wherein, in said information calculation step, said one cross-sectional configuration for setting the measuring coordinate system can also be manually designated.

35. A method for measuring a three-dimensional position according to claim 33, wherein, in said information calculation step, said vanishing point for setting the measuring coordinate system can also be manually designated.

36. A method for measuring a three-dimensional position of an inner surface of a hollow elongated member in an endoscopic observation system comprising:

an information calculation step for calculating information for setting a measuring coordinate system relating a position on an image of the elongated member having a uniform cross-section and a three-dimensional position on the elongated member by manually designating one cross-sectional configuration of the elongated member from a display screen on which the image of the elongated member is displayed, and by manually designating a vanishing point corresponding to a darkest point in the image; and a coordinate system setting step for setting the measuring coordinate system by using the information calculated in said information calculation step and known information on the elongated member and imaging means used to image the elongated member to enable calculation of the three-dimensional position on the elongated member corresponding to an arbitrary position in the image of the elongated member displayed on the display screen.

37. A method for measuring a three-dimensional position according to claim 36, wherein said coordinate system setting step includes a distance calculation step of calculating a distance from the position of the diameter to the imaging means forming the image.

38. A method for measuring a three-dimensional position according to claim 36, wherein three-dimensional coordinates at a center of said one of the two cross-sectional configurations are calculated from shifts of the corresponding cross-sectional configuration and the vanishing point and the value of said distance.

39. A method for measuring a three-dimensional position according to claim 36, wherein said information calculation step includes an inclination calculation step of calculating an inclination of an optical axis of the imaging means forming the image relative to a center axis of the elongated member.

40. A method for measuring a three-dimensional position according to claim 36, wherein said information calculation step includes a shift calculation step of calculating a shift of an optical axis of the imaging means forming the image from a center axis of the elongated member.

41. A method for measuring a three-dimensional position of an inner surface of a hollow elongated member in an endoscopic observation system comprising:

an information calculation step for calculating information for setting a measuring coordinate system relating a position on an image of the elongated member having a uniform cross section and a three-dimensional position on the elongated member by manually designating a first cross-sectional configuration of the elongated member from a display screen on which the image of the elongated member is displayed, and by manually designating a second cross-sectional configuration different from said first cross-sectional configuration from the display screen; and a coordinate system setting step for setting the measuring coordinate system by using the information calculated in said information calculation step and known information on the elongated member and imaging means used to image the elongated member to enable calculation of the three-dimensional position on the elongated member corresponding to an arbitrary position in the image of the elongated member displayed on the display screen.

42. A method for measuring a three-dimensional position according to claim 41, wherein center positions of the two first and second cross-sectional configurations are calculated from the two first and second cross-sectional configurations.

43. A method for measuring a three-dimensional position according to claim 41, wherein, in said coordinate system setting step, the measuring coordinate system is set by using information on the center positions and the known information.

44. A method for measuring a three-dimensional position according to claim 41, wherein said information calculation step includes an inclination calculation step of calculating an inclination of an optical axis of the imaging means forming the image relative to a center axis of the elongated member.

45. A method for measuring a three-dimensional position according to claim 41, wherein said information calculation step includes a shift calculation step of calculating a shift of an optical axis of the imaging means forming the image from a center axis of the elongated member.

* * * * *